US012403580B2

(12) United States Patent
Lefavour et al.

(10) Patent No.: US 12,403,580 B2
(45) Date of Patent: Sep. 2, 2025

(54) MEMBER FOR ADJUSTING FORCE APPLICATION IN RECIPROCATING ASSEMBLY

(71) Applicant: Hubbell Incorporated, Shelton, CT (US)

(72) Inventors: John Lefavour, Litchfield, NH (US); Robert Auger, Merrimack, NH (US); Cody McCarthy, Strafford, NH (US); Luke Desmarais, Milan, NH (US)

(73) Assignee: Hubbell Incorporated, Shelton, CT (US)

( * ) Notice: Subject to any disclaimer, the term of this patent is extended or adjusted under 35 U.S.C. 154(b) by 4 days.

(21) Appl. No.: 18/506,450

(22) Filed: Nov. 10, 2023

(65) Prior Publication Data

US 2024/0165784 A1 May 23, 2024

Related U.S. Application Data

(60) Provisional application No. 63/427,579, filed on Nov. 23, 2022.

(51) Int. Cl.
*B25F 5/00* (2006.01)

(52) U.S. Cl.
CPC .................................... *B25F 5/005* (2013.01)

(58) Field of Classification Search
CPC ....................................................... B25F 5/005
(Continued)

(56) References Cited

U.S. PATENT DOCUMENTS 3,208,396 A 9/1965 Budzich et al.
4,495,855 A * 1/1985 Murakami ................ F01B 3/02 417/269
(Continued)

FOREIGN PATENT DOCUMENTS

DE 102016111874 A1 * 1/2018 ............. B21D 28/34
DE 102016116878 A1 * 3/2018
(Continued)

OTHER PUBLICATIONS

International Search Report and Written Opinion issued on Apr. 4, 2024, by the International Searching Authority in corresponding International Patent Application No. PCT/US2023/079337. (20 pages).

*Primary Examiner* — Robert F Long
(74) *Attorney, Agent, or Firm* — Robinson + Cole LLP

(57) ABSTRACT

A reciprocating assembly includes a bore that contains hydraulic fluid. A piston is received within the bore and can move within the bore in a reciprocating motion between an extended position and a retracted position. Displacement of the piston within the bore causes displacement of hydraulic fluid when hydraulic fluid is in the bore. The piston includes an internal cavity extending at least partially along a length of the piston. The reciprocating assembly also includes a push pin that is received within the internal cavity. The bore, piston, and push pin are arranged so that movement of the push pin related to the bore causes translation of the piston within the bore to the extended position along a translation axis. The push pin can pivot during movement of the push pin between an in-line position and an angled position. The in-line position is substantially parallel to the translation axis.

20 Claims, 16 Drawing Sheets

(58) Field of Classification Search
USPC .............. 173/1–2, 13, 25–31, 38–39, 45–53, 173/18–20, 90, 184, 218
See application file for complete search history.

(56) References Cited

U.S. PATENT DOCUMENTS

| | | | | | |
|---|---|---|---|---|---|
| 5,342,178 | A * | 8/1994 | Kimura | F04B 27/1018 | 417/500 |
| 5,440,878 | A * | 8/1995 | Gleasman | F01B 3/02 | 91/506 |
| 5,664,634 | A * | 9/1997 | McCracken | B24B 23/00 | 173/205 |
| 5,725,058 | A * | 3/1998 | Eriksson | B23D 51/16 | 30/392 |
| 6,532,790 | B2 * | 3/2003 | Frenken | B25B 27/10 | 81/421 |
| 7,254,982 | B2 * | 8/2007 | Frenken | B25B 27/10 | 72/407 |
| 7,412,868 | B2 * | 8/2008 | Frenken | B25B 27/10 | 72/407 |
| 9,662,777 | B2 * | 5/2017 | Pomeroy | B25C 1/041 | |
| 10,468,847 | B2 * | 11/2019 | Frenken | H01R 4/20 | |
| 2007/0169728 | A1 | 7/2007 | Chasin et al. | | |
| 2007/0256554 | A1 | 11/2007 | Montminy et al. | | |
| 2010/0170931 | A1 * | 7/2010 | Viola | A61B 17/068 | 227/175.1 |
| 2011/0036609 | A1 * | 2/2011 | Blickle | B24B 23/028 | 173/213 |
| 2012/0153003 | A1 * | 6/2012 | Dittrich | B25F 5/00 | 173/1 |
| 2013/0264085 | A1 * | 10/2013 | Ciotti | B25F 5/005 | 173/29 |
| 2014/0082949 | A1 * | 3/2014 | Kocsis | B23D 51/16 | 30/392 |
| 2014/0182872 | A1 * | 7/2014 | Rubens | B24B 23/04 | 173/213 |
| 2015/0283693 | A1 * | 10/2015 | Chiasson | B25F 5/005 | 173/168 |
| 2015/0364889 | A1 * | 12/2015 | Frenken | H01R 43/0427 | 29/862 |
| 2016/0368128 | A1 * | 12/2016 | Uchiyama | F16K 17/048 | |
| 2018/0326600 | A1 * | 11/2018 | Wason | B26B 15/00 | |
| 2019/0381643 | A1 * | 12/2019 | Fan | B25C 1/08 | |
| 2020/0006907 | A1 * | 1/2020 | Torrey | A01G 3/02 | |
| 2020/0180049 | A1 * | 6/2020 | Frenken | B23D 29/00 | |
| 2020/0215672 | A1 * | 7/2020 | Pomeroy | B25C 1/047 | |
| 2023/0120099 | A1 * | 4/2023 | LeFavour, Jr. | B25B 27/146 | 173/216 |
| 2023/0275382 | A1 * | 8/2023 | Frenken | H01R 43/0428 | 29/592 |
| 2023/0398675 | A1 * | 12/2023 | Bobowicz | B25B 27/10 | |
| 2024/0009816 | A1 * | 1/2024 | Frenken | B25B 27/146 | |
| 2024/0051108 | A1 * | 2/2024 | Kamijo | F04B 53/16 | |

FOREIGN PATENT DOCUMENTS

| | | | | |
|---|---|---|---|---|
| EP | 1176308 | B1 * | 5/2006 | B25B 27/10 |
| EP | 3088134 | A2 * | 11/2016 | B21F 15/00 |
| EP | 3243604 | B1 * | 11/2019 | B21D 39/04 |
| TW | 451030 | B * | 8/2001 | |
| TW | 586977 | B * | 5/2004 | |
| WO | WO-2021069587 | A1 * | 4/2021 | B21D 39/048 |
| WO | WO-2024112516 | A1 * | 5/2024 | B25F 5/005 |

* cited by examiner

MEMBER FOR ADJUSTING FORCE APPLICATION IN RECIPROCATING ASSEMBLY

CROSS-REFERENCE TO RELATED APPLICATION

This application claims priority to U.S. Provisional Patent Application No. 63/427,579, filed Nov. 23, 2022, the entire contents of which is hereby incorporated by reference.

FIELD

The present disclosure relates to piston assembly. More particularly, the present disclosure relates to a push pin for directing a force applied to a piston used in a reciprocating assembly.

BACKGROUND

Reciprocating assemblies, like gas engines, hydraulic pumps, and pneumatic cylinders among other things, utilize one or more pistons to move a working fluid (e.g., gasoline, oil, air, etc.). The piston is received within a cylinder and moves back and forth in a reciprocating motion. In a retracted position, the working fluid may fill the cylinder. In an extended position, the piston may push the working fluid out of the cylinder.

To move to the extended position, a force must be applied to the piston, which must overcome a force within the cylinder. In some examples, like an internal combustion engine, the force must be enough to compress the working fluid (e.g., gasoline). In other examples, the piston may need to overcome a spring force or some other oppositely directed force.

The reciprocating motion may be provided by a rotating cam and a wobble plate. The inclination of the rotating cam may cause the wobble plate to rock back and forth. This rocking motion creates the reciprocating motion to move the piston forward and backward within the cylinder.

Because the cam, and therefore the wobble plate, is angled relative to the piston, the force provided by the wobble plate may include components in multiple directions. In other words, the force may not be directed entirely along the axis of the cylinder. This results in inefficiencies in the system because a greater resultant force is needed to supply the necessary component force directed along the cylinder. Additionally, force components in other directions (e.g., perpendicular to the axis of the cylinder) may drive the piston against the wall of the cylinder, particularly while the piston moves forward toward the end of the cylinder. This may lead to frictional wear between the cylinder and the piston, which can degrade either of the pieces and ultimately lead to a failure.

SUMMARY

Various examples of the present disclosure can overcome the aforementioned and other disadvantages associated with known piston assemblies and offer new advantages as well.

According to one aspect of various examples of the present disclosure there is provided a piston assembly that directs force substantially along an axis of the cylinder.

According to another aspect of various examples of the present disclosure, there is provided a piston having a hollow center and a push pin received within the hollow center. The push pin adapted to apply a force within the hollow center in order to reduce a perpendicular component of force.

According to another aspect of various examples of the present disclosure, there is provided a reciprocating assembly for driving a working portion of a tool, the reciprocating assembly comprising: a piston including an internal cavity extending at least partially along the length of the piston; and a push pin received within the internal cavity; wherein movement of a drive assembly is configured to supply a force for moving the piston, the force being applied to the push pin to translate the piston; and wherein the push pin is configured to pivot as the drive assembly moves between an in-line position and an angled position, the in-line position being substantially parallel to an axis along which the piston moves.

According to another aspect of various examples of the present disclosure, there is provided a reciprocating assembly for driving a working portion of a tool, the reciprocating assembly comprising: a bore configured to contain hydraulic fluid; a piston received within the bore and configured to move within the bore in a reciprocating motion between an extended position and a retracted position, wherein displacement of the piston within the bore is configured to cause displacement of hydraulic fluid when hydraulic fluid is in the bore, the piston including an internal cavity extending at least partially along a length of the piston; and a push pin received within the internal cavity of the piston; wherein the bore, the piston, and the push pin are configured such that a movement of the push pin relative to the bore causes translation of the piston within the bore to the extended position along a translation axis; and wherein the push pin is configured to pivot during movement of the push pin between an in-line position and an angled position, the in-line position being substantially parallel to the translation axis.

In some forms: a) the cavity extends along a majority of the length of the piston; b) the push pin includes a cutout at each of two opposite ends; c) each cutout is configured to at least partially receive a ball bearing; and/or d) one of the ball bearings is received within the internal cavity and the other of the ball bearings is coupled to a drive assembly configured to supply a force which causes the movement of the push pin.

In some forms: a) the push pin includes two opposite hemispherically shaped ends, wherein one of the hemispherically shaped ends is received within the internal cavity and the other of the hemispherically shaped ends is coupled to a drive assembly configured to supply a force which causes the movement of the push pin; b) the push pin includes a hyperboloid shape; c) the internal cavity includes a terminal end and an open end, the open end being wider than the terminal end; d) the open end has a frustoconical shape; and/or e) a width of the open end is greater than a total distance of travel of the push pin.

In some forms: a) an O-ring is connected to an outer surface of the push pin; b) the O-ring is compressible; c) a drive assembly can supply a force which causes the movement of the push pin; and/or d) the bore is configured to receive hydraulic fluid from a reservoir.

In some forms: a) a drive assembly includes an electric motor, a gear assembly configured to be driven by the electric motor, an inclined plate rotatably connected to the gear assembly and configured to be driven by the gear assembly, and a wobble plate connected to the inclined plate and configured to be driven by rotation of the inclined plate; b) the wobble plate is configured to not rotate with the inclined plate; c) an anti-rotational assembly is connected between the wobble plate and a housing containing the bore; d) the anti-rotational assembly can limit rotation of the wobble plate and permit axial movement of the wobble plate; e) the anti-rotational assembly includes at least one spring that extends axially between the wobble plate and the housing; f) the anti-rotational assembly includes at least one spring that extends axially between the wobble plate and the housing; g) the anti-rotational assembly includes a pin that extends radially between the wobble plate and the housing; h) the outer perimeter of the wobble plate includes a series of teeth and grooves; and/or i) the pin is configured to fit in a groove between adjacent teeth.

A reciprocating assembly for driving a working portion of a tool, the reciprocating assembly including: a bore configured to contain hydraulic fluid; a piston received within the bore and configured to move within the bore in a reciprocating motion between an extended position and a retracted position, wherein displacement of the piston within the bore is configured to cause displacement of hydraulic fluid when hydraulic fluid is in the bore, the piston including an internal cavity extending at least partially along a length of the piston; and a push pin having a first end received within the internal cavity of the piston, the first end having a first radius of curvature; wherein the push pin is configured to pivot about a center of the first radius of curvature between an in-line position and an angled position, the in-line position substantially parallel to a translation axis of the piston; and wherein the piston is configured to move from the retracted position toward the extended position when the push pin is in the in-line position.

In some forms: a) the first end includes a first cutout having the first radius of curvature; b) the first cutout at least partially receiving a first ball bearing; c) the push pin is configured to rotate about the first ball bearing; d) a second end of the push pin opposite the first end includes a second cutout having a second radius of curvature; e) the second cutout at least partially receiving a second ball bearing; and/or f) the second ball bearing is coupled to a drive assembly can supply a force which causes the movement of the push pin.

In some forms: a) the push pin includes a hyperboloid shape; b) the internal cavity includes a terminal end and an open end; c) the open end being wider than the terminal end; d) an O-ring is connected to an outer surface of the push pin; e) the O-ring is compressible; and/or f) wherein the first end is hemispherically shaped.

In some forms: a) a drive assembly can supply a force which causes the movement of the push pin; b) the drive assembly includes an electric motor, a gear assembly configured to be driven by the electric motor, an inclined plate rotatably connected to the gear assembly and can be driven by the gear assembly, and a wobble plate connected to the inclined plate and configured to be driven by rotation of the inclined plate; c) the wobble plate is configured to not rotate with the inclined plate; d) an anti-rotational assembly is connected between the wobble plate and a housing containing the bore; e) the anti-rotational assembly can limit rotation of the wobble plate and permit axial movement of the wobble plate; f) the anti-rotational assembly includes at least one spring that extends axially between the wobble plate and the housing; g) the anti-rotational assembly includes a pin that extends radially between the wobble plate and the housing; h) the outer perimeter of the wobble plate includes a series of teeth and grooves; and/or i) the pin is configured to fit in a groove between adjacent teeth.

In some forms: a) an arc angle of the first end is less than 180 degrees; and/or b) the bore, the piston, and the push pin can such that a movement of the push pin relative to the bore causes translation of the piston within the bore to the extended position along the translation axis.

A reciprocating assembly for driving a working portion of a tool, the reciprocating assembly including: a bore configured to contain hydraulic fluid; a piston received within the bore and configured to move within the bore in a reciprocating motion between an extended position and a retracted position, wherein displacement of the piston within the bore is configured to cause displacement of hydraulic fluid when hydraulic fluid is in the bore; and a push pin contacting the piston; a drive assembly configured to supply a force which causes the movement of the push pin, the drive assembly including a non-rotational plate configured to supply the force by rocking between a first plate position and a second plate position, the plate being closer to the piston in the first plate position than in the second position; wherein the bore, the piston, and the push pin are configured such that a movement of the push pin relative to the bore causes translation of the piston within the bore to the extended position along a translation axis; and wherein the push pin is configured to pivot during the movement of the push pin, between an in-line position and an angled position, the in-line position substantially parallel to the translation axis, the push pin being in the in-lined position when the plate is in the first plate position and the push pin being in the angled position in the second plate position.

In some forms: a) the piston includes an internal cavity extending at least partially a length of the piston; b) the push pin is at least partially received within the internal cavity; c) the internal cavity includes a terminal end and an open end; and/or d) the open end being wider than the terminal end.

In some forms: a) the push pin includes a first concave region; b) the plate includes a second concave region; c) a ball bearing at least partially received within the first concave region and in the second concave region; d) the ball bearing configured to permit relative movement between the push pin and the plate; and/or e) the second concave region has a larger radius of curvature than the first concave region.

In some forms: a) the push pin includes a hyperboloid shape; b) the push pin further includes a first end having a first concave region and a second end having a second concave region; c) a first ball bearing is received within the first concave region and contacts the piston; d) a second ball bearing is received within the second concave region and contacts the plate; e) the push pin further includes a first end having a first hemispherically shaped region and a second end having a second hemispherically shaped region; f) the first hemispherically shaped region contacts the piston; g) the second hemispherically shaped region contacts the plate; h) an O-ring connected to an outer surface of the push pin; i) the O-ring is compressible.

In some forms: a) the bore is a first bore, the push pin is a first push pin and a piston is a first piston; b) a second bore is spaced apart from the first bore and can contain hydraulic fluid; c) a second piston received within the second bore and can move within the second bore in a reciprocating motion between an extended position and a retracted position; d) displacement of the second piston within the second bore is can cause displacement of hydraulic fluid when hydraulic fluid is in the second bore; e) the drive assembly can supply a force which causes the movement of the second push pin; f) the plate is closer to the first piston in the first plate position and closer to the second piston in the second position; g) the first bore is parallel to the second bore; h) the translational axis is a first translational axis; i) the second piston moves along a second translational axis that is parallel to the first translational axis; j) the second push pin can pivot during the movement of the second push pin, between a second in-line position and a second angled position; k) the second in-line position substantially parallel to the second translation axis; l) the second push pin being in the second in-lined position when the plate is in the second plate position and the second push pin being in the angled position in the first plate position; m) a second push pin contacting the second piston.

In some forms: a) the drive assembly includes an electric motor, a gear assembly configured to be driven by the electric motor, an inclined plate rotatably connected to the gear assembly and configured to be driven by the gear assembly, and the non-rotational plate connected to the inclined plate and configured to be driven by rotation of the inclined plate; and/or b) the non-rotational plate is configured to not rotate with the inclined plate.

A push pin for use in a reciprocating assembly for driving a working portion of a tool, the push pin including: a body having a first end and a second end opposite to the first end, wherein, a first cutout formed at the first end, and a second cutout formed at the second end; wherein the first end of the body is configured to be received within a bore of a piston such that movement of the push pin relative to the bore causes translation of the piston within the bore to the extended position along a translation axis.

In some forms: a) the body has a substantially cylindrical shape; b) the push pin includes a hyperboloid shape; c) an arc angle of the first cutout is less than 180 degrees; d) the push pin is constructed from a rigid material and can be incompressible when contacting the piston; and/or e) the first cutout is configured to receive a first ball bearing and the second cutout can receive a second ball bearing.

A tool including: a working portion; a piston configured to move in a reciprocating motion to drive a hydraulic fluid and drive the working portion, the piston including an internal cavity extending at least partially along a length of the piston; and a push pin received within the internal cavity of the piston; wherein the piston and the push pin are configured such that a movement of the push pin drives movement of the piston along a translation axis; and wherein the push pin is configured to pivot during the movement of the push pin, between an in-line position and an angled position, the in-line position substantially parallel to the translation axis.

In some forms: a) the cavity extends along a majority of the length of the piston; and/or b) the working portion includes a first jaw and a second jaw movable relative to the first jaw to perform a crimping function.

In some forms: a) a drive assembly for driving movement of the push pin; b) a drive assembly includes an electric motor, a gear assembly configured to be driven by the electric motor, an inclined plate rotatably connected to the gear assembly and configured to be driven by the gear assembly, and a wobble plate connected to the inclined plate and configured to be driven by rotation of the inclined plate; c) the wobble plate is configured to not rotate with the inclined plate; and/or d) movement of the wobble plate drives the movement of the push pin.

In some forms: a) the piston is a first piston, the push pin is a first push pin, and the translational axis is a first translational axis; b) a second piston can move in a reciprocating motion to drive hydraulic fluid and drive the working portion; c) the second piston including a second internal cavity extending at least partially along a length of the second piston; d) a second push pin received within the second internal cavity of the second piston; e) the second piston and the second push pin allow a movement of the second push pin drives movement of the second piston along a second translation axis that is parallel to the first translational axis; f) the second push pin can pivot during the movement of the second push pin, between a second in-line position and a second angled position, the second in-line position substantially parallel to the second translation axis; and/or g) an axis along the first push pin in the angled position is obliquely oriented to an axis along the second push pin in the second angled position.

In some forms: a) the piston includes a first end with a first cutout having the first radius of curvature; b) the first cutout at least partially receives a first ball bearing; c) the first end and the first ball bearing being received within the internal cavity; and/or d) the push pin is configured to rotate about the first ball bearing.

In some forms: a) the push pin includes two opposite hemispherically shaped ends; b) one of the hemispherically shaped ends is received within the internal cavity and the other of the hemispherically shaped ends is coupled to a drive assembly that can supply a force which causes the movement of the push pin; b) the push pin includes a hyperboloid shape; c) an O-ring connected to an outer surface of the push pin; and/or d) the O-ring is compressible.

A tool including: an electric motor; a gear assembly configured to be driven by the electric motor; an inclined plate rotatably connected to the gear assembly and configured to be driven by the gear assembly; and a wobble plate connected to the inclined plate and configured to be driven by rotation of the inclined plate; an anti-rotational assembly configured to prevent the wobble plate from rotating with the inclined plate; and a push pin driven by movement of the wobble plate between a first position and a second position, the push pin configured to move a piston along a piston axis to drive a hydraulic fluid in the first position; wherein the push pin is parallel to the axis in the first position and is oblique to the piston axis in the second position.

In some forms: a) the anti-rotational assembly includes at least one spring that extends axially between the wobble plate and the housing; b) the spring is compressible along a spring axis parallel to the piston axis; c) the anti-rotational assembly includes a pin that extends radially between the wobble plate and the housing; d) the outer perimeter of the wobble plate includes a series of teeth and grooves; e) the pin can fit in a groove between adjacent teeth; and/or f) each tooth of the series of teeth are frustoconically shaped.

According to another aspect of various examples of the present disclosure, there is provided a reciprocating assembly of any of the previous aspects; and a working portion configured to be driven by the reciprocating assembly.

The disclosure herein should become evident to a person of ordinary skill in the art given the following enabling description and drawings. The drawings are for illustration purposes only and are not drawn to scale unless otherwise indicated. The drawings are not intended to limit the scope of the invention. The following enabling disclosure is directed to one of ordinary skill in the art and presupposes that those aspects within the ability of the ordinarily skilled artisan are understood and appreciated.

BRIEF DESCRIPTION OF THE DRAWINGS

Various aspects and advantageous features of the present disclosure will become more apparent to those of ordinary skill when described in the detailed description of preferred examples and reference to the accompany drawings.

DETAILED DESCRIPTION

Figure 1:
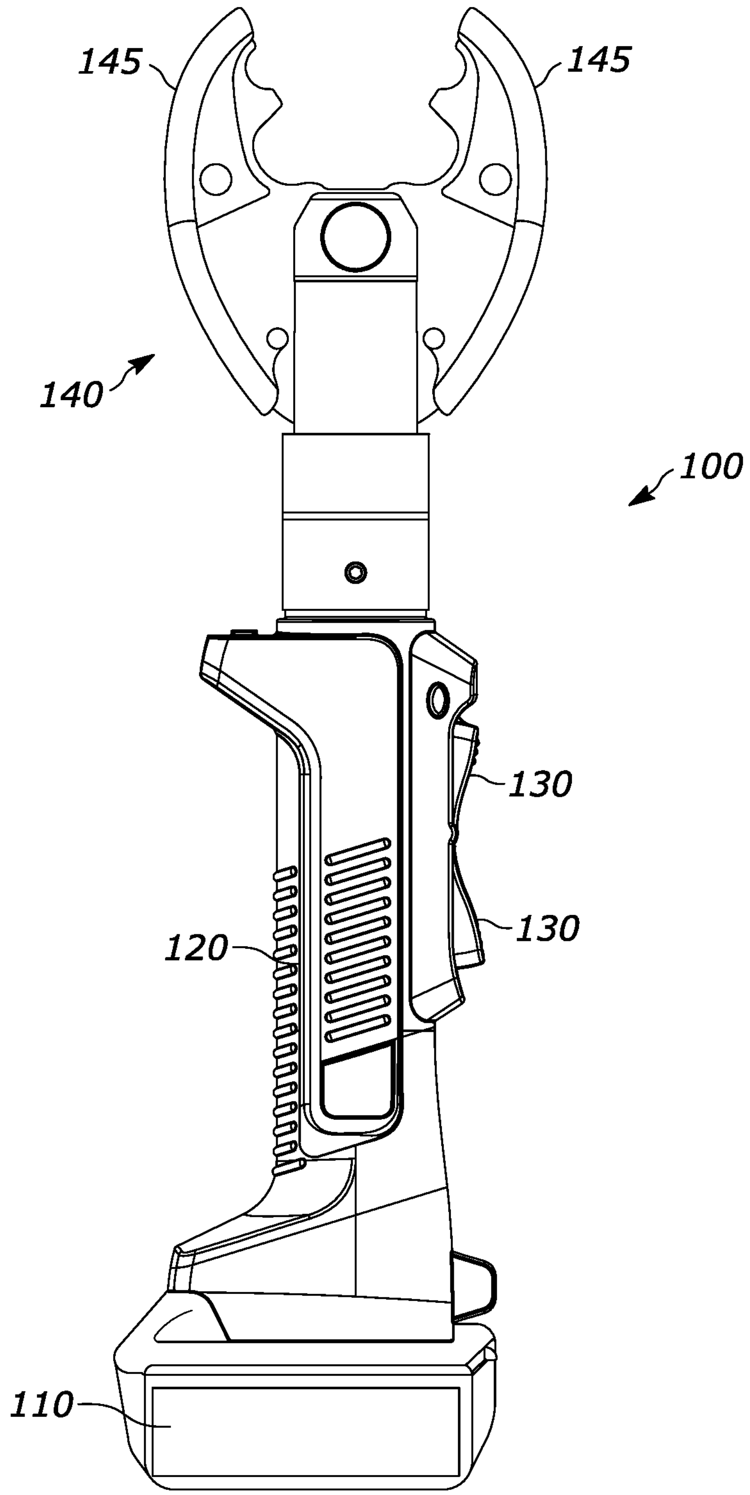
FIG. 1 shows a tool according to an exemplary example of the disclosure.

FIG. 1 illustrates a tool 100. The illustrated tool 100 is a handheld power tool, which allows the tool 100 to be portably used at different work sites. The tool 100 may be powered by a rechargeable battery 110 (e.g., an 18V battery pack). This type of battery 110 may be interchanged with other types of power tools.

The tool 100 includes an elongated body 120 that a user grips while using the tool 100. The elongated body 120 includes one or more controls 130 (e.g., two shown) for operating the tool 100. The battery 110 is removably connected to the one end of the body 120. The one or more controls 130 may be disposed between the ends of the elongated body 120.

The illustrated tool 100 includes a working portion 140 connecting to an opposite end of the elongated body 120 from the battery 110. The illustrated working portion 140 is configured for performing a crimping or cutting function. The working portion 140 includes a pair of jaws 145 that move relative to one another to cut or crimp a piece of material. Other examples of tools (not shown) may include other working portions 140.

The illustrated tool 100 may be a hydraulic tool (e.g., an in-line hydraulic tool). As will be described in more detail below, the electrical energy from the battery 110 may be used to drive a hydraulic fluid, that in turn drives the working portion 140.

As shown in FIGS. 2 to 8, the tool 100 may include a motor 200 (e.g., a brushless DC motor). The motor 200 may be electrically connected to the battery 110 when the battery 110 is connected to the body 120. When the tool 100 is powered on, current from the battery 110 may drive operation of the motor 200.

Figure 3:
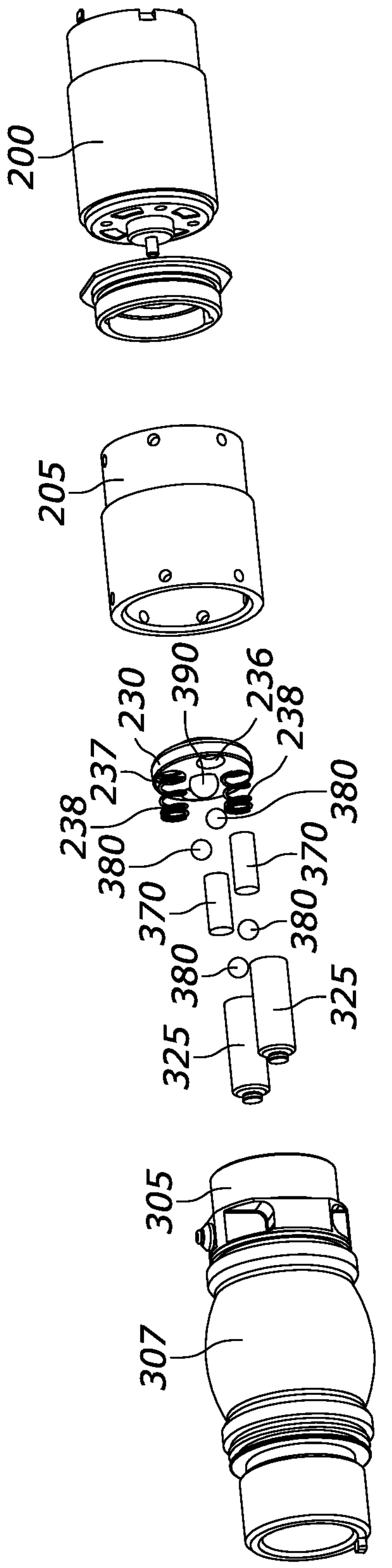
FIG. 3 shows an exploded view of the tool of FIG. 2.
Figure 4:
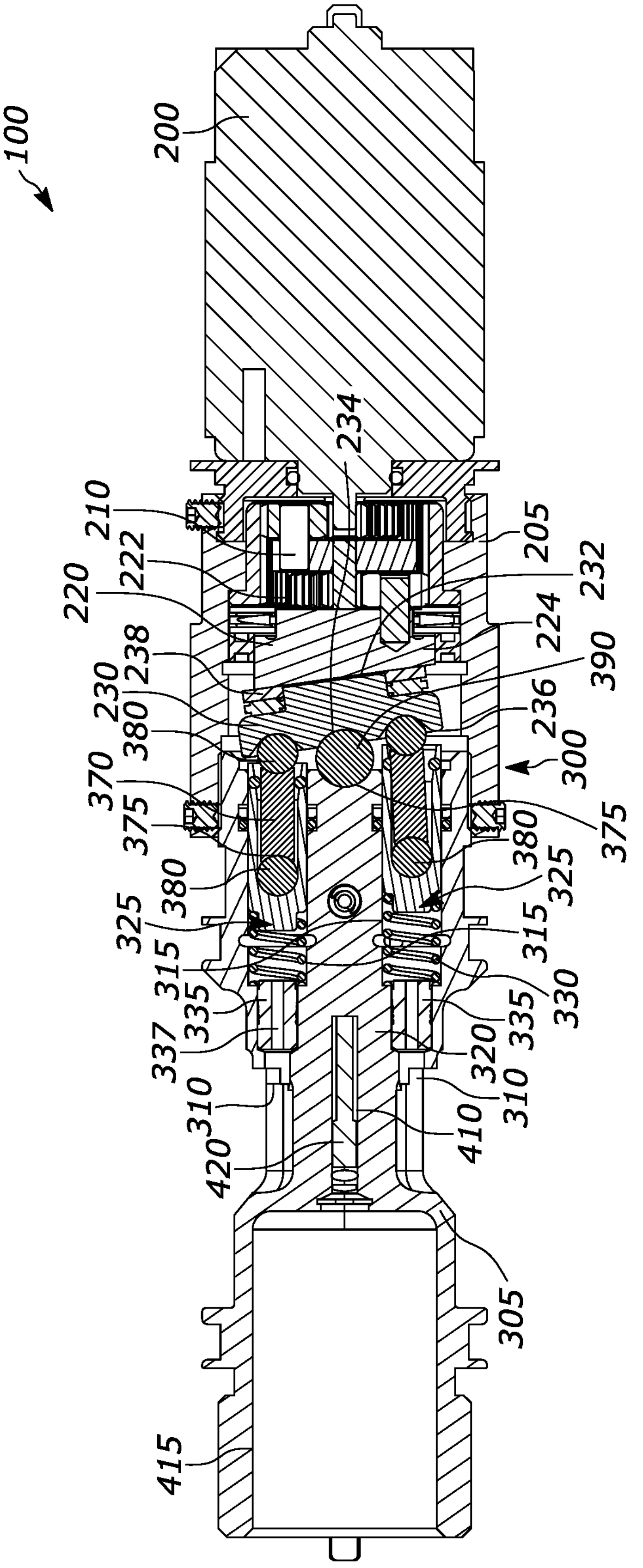
FIG. 4 shows a cross-sectional view of the tool of FIG. 1, illustrating the tool in a first position.

With continued reference to FIGS. 3 and 4, the tool 100 may include a gear assembly 210 that is received within a transfer casing or housing 205 and that is connected to the motor 200. Rotation of the motor 200 may drive the rotation of the gear assembly 210.

As shown in FIGS. 4 to 8, the tool 100 may also include an inclined plate 220 within the housing 205 that is connected to the gear assembly 210. For example, the gear assembly 210 may be disposed between the motor 200 and the inclined plate 220. The gear assembly 210 may receive energy from the motor 200 and may output energy to the inclined plate 220. The illustrated example of the tool 100 shows the motor 200, the gear assembly 210, and the inclined plate 220 in-line (e.g., along a common axis), although other orientations may be used. When the motor 200, the gear assembly 210, and the inclined plate 220 are oriented in-line, the common axis may extend along the elongated body 120 (e.g., between the ends of the elongated body 120).

In the illustrated example, the inclined plate 220 may include a first planar surface 222 and a second planar surface 224. The first planar surface 222 may be disposed proximate to the gear assembly 210 and the second planar surface 224 may be disposed opposite to the first planar surface 222. Each of the planar surfaces 222, 224 may be relatively flat (e.g., not curved), although other structures may be possible.

The second planar surface 224 may be oblique with respect to the first planar surface 222. For example, the second planar surface 224 may be oriented so that the distance between the first and second surfaces 222, 224 is greater at one side than at another side. The second planar surface 224 may also be oriented obliquely with respect to an axis about which the motor 200 rotates.

A wobble plate 230 is illustrated as being in contact with the second planar surface 224 and disposed within the housing 205. The wobble plate 230 may include a third planar surface 232 that rests against the second planar surface 224. For example, the third planar surface 232 may be oriented so that it is parallel to the second planar surface 224.

An opposite end of the wobble plate 230 from the third planar surface 232 includes a surface with a series of grooves. For example, the wobble plate 230 may include a central groove 234 and side grooves. For example, the wobble plate 230 may include four side grooves, although any number (e.g., three, five, six, etc.) of grooves may be included.

In some examples, the grooves may include a pair of first grooves 236 and a pair of second grooves 237. In the illustrated example, the first and second grooves 236, 237 may be substantially the same size, although in other examples the one of the pairs of grooves may be larger than the other. All the grooves 234, 236, 237 may be spaced apart from one another. For example, the first and second grooves 236, 237 may be spaced (e.g., equally spaced) around the perimeter of the wobble plate 230 and the central groove 234 may be spaced in the center of the first and second grooves 236, 237. Each first groove 236 may be disposed approximately 180° apart from one another, and each second groove 237 may be disposed approximately 180° apart from one another.

In the illustrated example, each of the grooves 234, 236, 237 may have a rounded shape. In some examples, each groove 234, 236, 237 may have a constant curvature, although in other examples at least one of the grooves 234, 236 may include a non-uniform curvature. Additionally, the angle of curvature in each of the grooves 234, 236, 237 may be less than about 180°, although some examples may include a greater angle of curvature. For example, the illustrated grooves 234, 236, 237 may each have an angle of curvature that is less than about 90°.

A hydraulic assembly 300 is connected to the housing 205. For example, the hydraulic assembly 300 may generally be positioned outside of the housing 205 although at least some of the hydraulic assembly 300 may be at least partially received within the housing 205. As will be described in more detail below, the hydraulic assembly 300 includes pistons for driving a working fluid that ultimately drives operation of the working portion 140.

Figure 2:
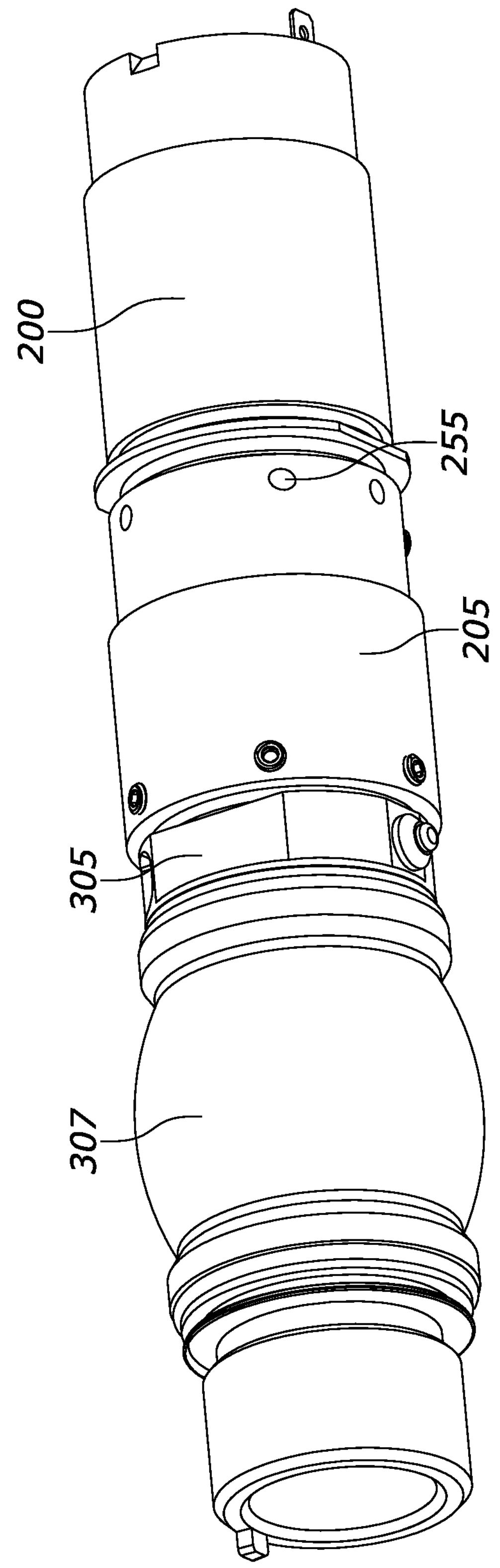
FIG. 2 shows a perspective view of a portion of the tool of FIG. 1.

As shown in FIGS. 2 and 3, the hydraulic assembly 300 includes a housing 305. The illustrated housing 305 is partially received within the housing 205. The housing 305 of the hydraulic assembly 300 includes a pair of inlet ports 310 (see e.g., FIG. 4) that are received within a reservoir 307 that can store hydraulic fluid (e.g., oil). The reservoir 307 may be permanently or removably connected to the housing 305.

As shown in FIG. 4, each inlet port 310 extends into a bore 315 within the housing 305. The bore 315 may be open at an opposite end from the respective inlet port 310, with the opening of the bore 315 being disposed within the housing 205. A wall 320 may separate the bores 315 from one another. Each of the bores 315 may contain hydraulic fluid during operation of the tool 100.

Figure 6:
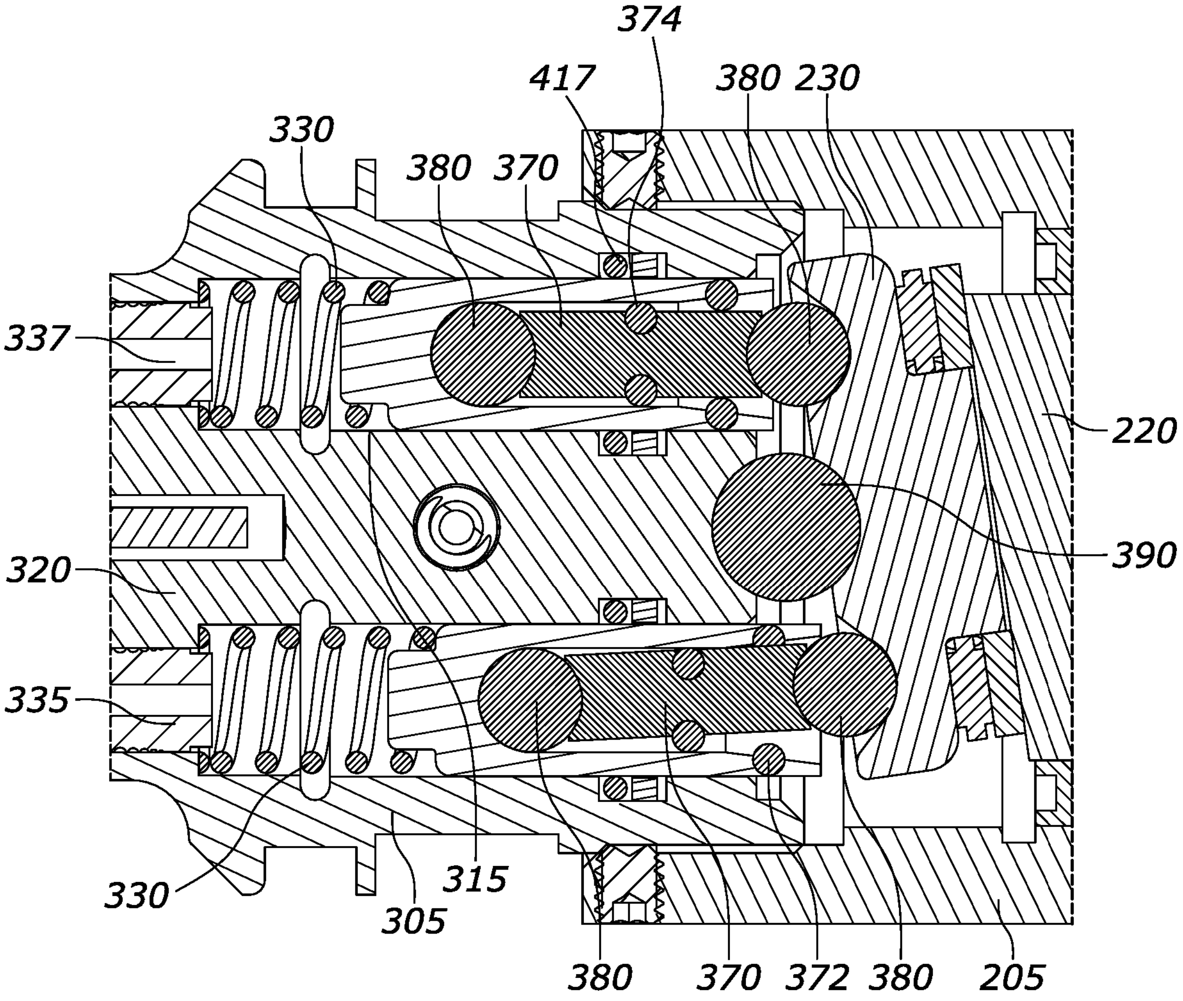
FIG. 6 shows a detailed view of an alternative version of the cross-sectional view of FIG. 4.
Figure 8:
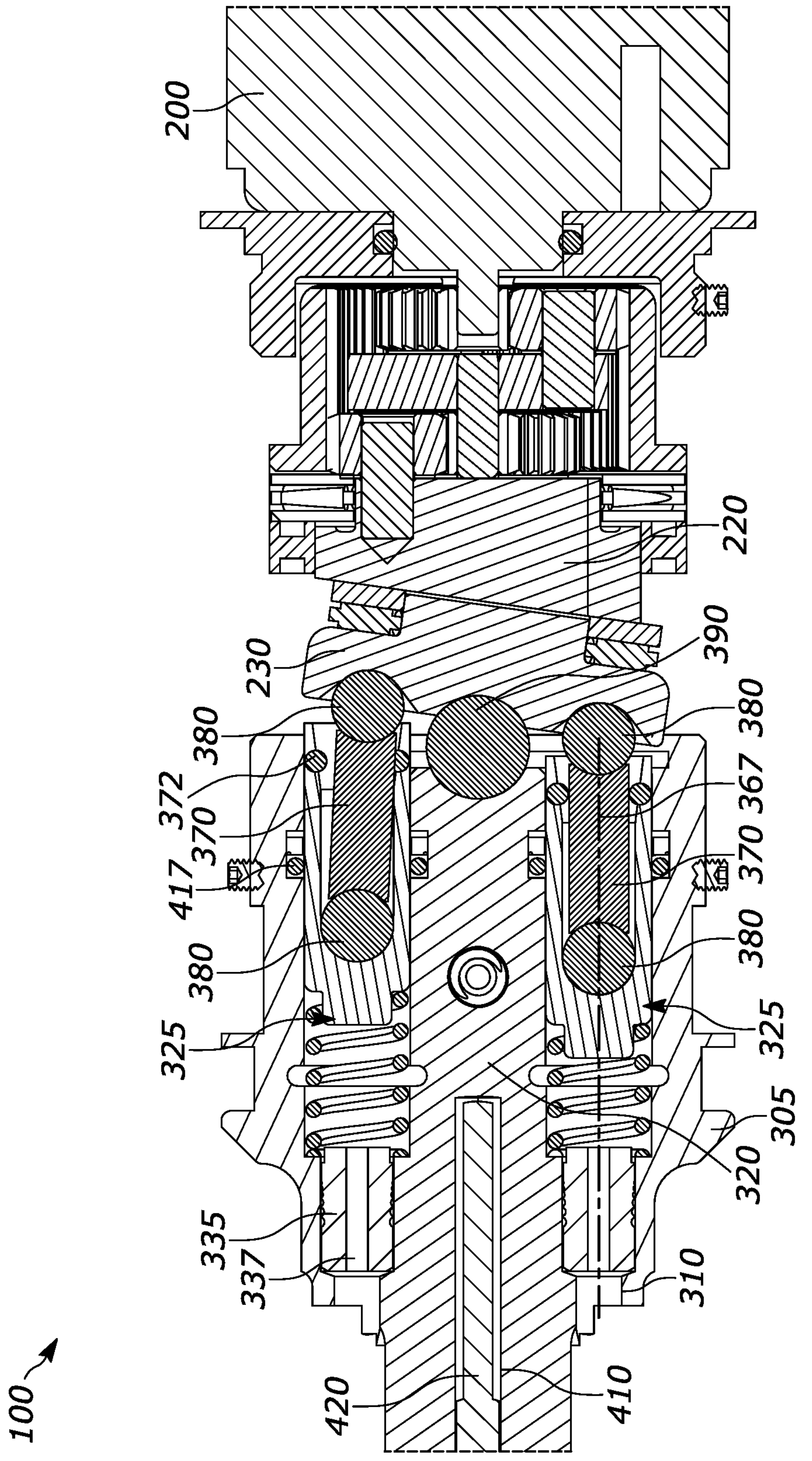
FIG. 8 shows a detailed view of the cross-sectional view of FIG. 7.

As shown in FIGS. 4, 6, and 8, piston 325, a spring 330, and a valve 335 are located within each bore 315. A valve 335 is positioned within each bore 315 proximate to the respective inlet port 310. The valve 335 may include a passage 337 that can permit fluid to travel from the respective inlet 310 to the respective bore 315. The valve 335 may be a one-way valve so that fluid from the reservoir 307 can enter the passageway 337 to reach one of the bores 315, while fluid within the bores 315 cannot return to the reservoir 307 through the passageway 337. The spring 330 is connected to the bore proximate to the respective inlet 310 and the piston 325 is connected to the other end of the spring 330 and extends toward the other end of the bore 315 proximate to the housing 205.

The spring 330 may be biased toward the wobble plate 230 and may be compressible as the respective piston 325 moves toward the inlet 310. Each spring 330 therefore may oppose the translational motion of the respective piston 325 in one direction.

Figure 9:
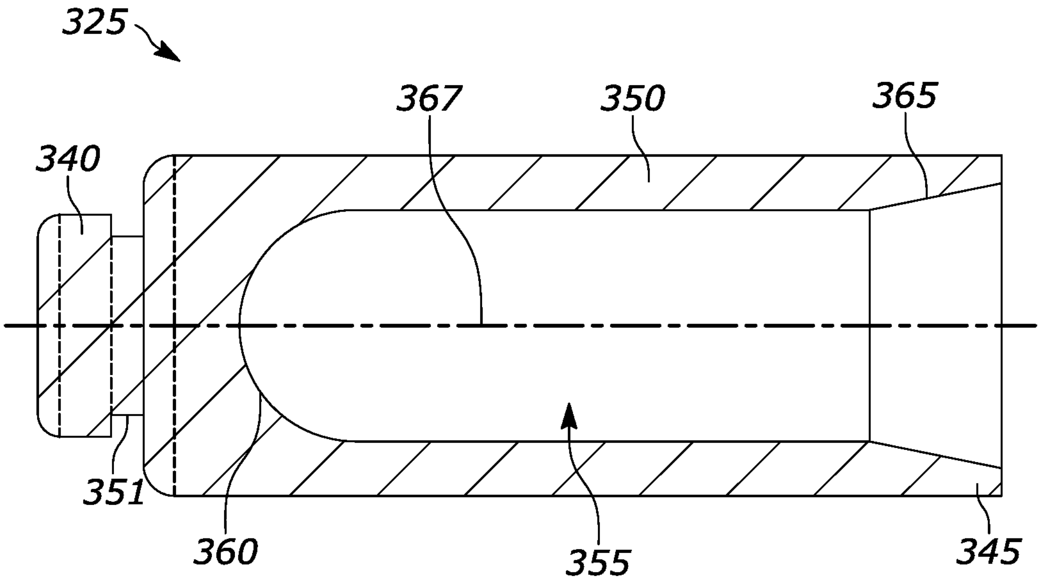
FIG. 9 shows a cross-sectional view of a piston used with the tool of FIG. 1.

As shown in FIG. 9, each piston 325 includes a first end 340 and a second end 345 opposite to the first end 340. In the illustrated example, the first end 340 has a solid surface. For example, the first end 340 may include a planar surface, which may be substantially perpendicular to the direction of travel of the piston 325.

In some forms, the first end 340 may extend away from the body 350 of the piston 325. For example, the first end 340 may project beyond the body 350 and may have a different width than the remainder of the body 350. In the illustrated example, the first end 340 may be at least partially cylindrical with a smaller diameter than the diameter of the body 350.

In certain forms, an undercut 351 may be positioned between the first end 340 and the remainder of the body 350. The undercut 351 may be formed because of the smaller diameter of the first end 351. An end of the spring 330 may be coupled to the body 350 via the undercut 351. In other examples, a seal may be disposed at least partially within the undercut 351.

The second end 345 may have an opening that extends into a cavity 355 of the body 350. The cavity 355 may extend at least partially along the length of the body 350. For example, the illustrated example in FIG. 9 shows the cavity 355 extending along a majority of the length of the body 350 but does not reach the first end 340. Although other lengths are possible is other examples (e.g., extending to the first end 340, extending less than a majority of the length of the body 350, etc.).

In the illustrated example, the cavity 355 may be substantially cylindrical and may include a terminal end 360 that is at least partially spherical in shape. For example, the terminal end 360 may have a hemispherical shape, although other shapes may also be used.

The open end 365 of the cavity 355 (e.g., proximate to the second end 345 and opposite from the terminal end 360) forms the opening of the second end 345 and may have a different width than the remainder of the cavity 355. For example, the open end 365 of the cavity 355 may have a frustoconical shape and may taper outwardly so that the entrance to the cavity 355 at the second end 345 is wider than the width of the cavity 355 along the remainder of the cavity 355. The outer dimension of the piston 325 may remain substantially uniform along the length of the body 350. The thickness of a wall of the body 350 (e.g., distance between the wall of the cavity 355 and the outer wall of the piston 325) may therefore be less proximate to the second end 345 than to the first end 340. In other examples, the cavity 355 may have a substantially uniform width along its entire length.

Figure 10:
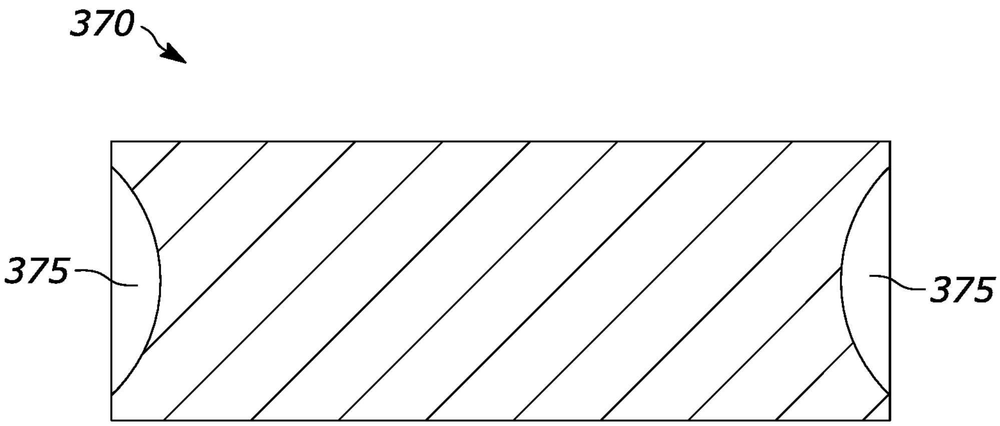
FIG. 10 shows a cross-sectional view of a push pin used with the tool of FIG. 1.

Returning to FIGS. 4 to 8, a push pin 370 may be positioned within each cavity 355. The push pin 370 may be a substantially cylindrical member. Each end of the push pin 370 may include a cutout 375 with a rounded or partially spherical shape. As better shown in FIG. 10, each cutout 375 may be less than hemispherical, although any shaped cutout 375 may be used.

Returning to FIGS. 4 to 8, a spherical member (e.g., a ball bearing) 380 may be at least partially received with each of the cutouts 375. In other words, one ball bearing 380 may be partially received within each of the cutouts 375 on each of the push pins 370. Because each cutout 375 has an arc angle of less than 180° (i.e., is not fully hemispheric), each cutout 375 may cradle the respective ball bearing 380 without fully surrounding it.

The ball bearings 380 may be a substantially rigid member that may not be substantially compressed while in use. The ball bearing 380 may be constructed from a metal (e.g., steel), a ceramic, a plastic, or a similar material.

The ball bearings 380 additionally rest on another surface. For example, one ball bearing 380 is received entirely within the cavity 355 and is positioned at the terminal end 360. The hemispherical shape of the terminal end 360 may substantially match the shape of the ball bearing 380 (e.g., it may have the substantially the same radius of curvature). The ball bearing 380 therefore may be substantially flush against the surface of the terminal end 360.

The push pin 370 extends away from the terminal end 360 toward the second end 345 of the body 350. In the illustrated example, the push pin 370 may extend into the open end 365 (e.g., the frustoconical portion) but may not extend beyond the second end 345. However, other examples may include a longer push pin 370 that extends beyond the second end 345 and into the housing 205.

The ball bearing 380 proximate to the open end 365 may be received between a cutout 375 of the piston 325 and a respective one of the side grooves 236. The ball bearing 380 therefore may be positioned at least partially outside of the cavity 355. The cutout 375 of the push pin 370 may have a substantially similar shape as the ball bearing 380 (e.g., substantially the same radius of curvature). Each first side groove 236 may have a larger radius of curvature as compared to the ball bearing 380 so that the ball bearing 380 is loosely received within the respective first side groove 236.

In some forms, the ball bearings 380 may be substantially the same size and the cutouts 375 in the push pins 370 may also be substantially the same size as one another. The push pins 370 may be used with either end inserted into the cavity 355.

The wall 320 may also include a cutout 385. A central ball bearing 390 may be received at least partially within the cutout 385 and the central groove 234 of the wobble plate 230. In the illustrated example, the central ball bearing 390 may be larger than the ball bearings 380. Accordingly, the cutout 385 of the wall 320 may be larger than the cutouts 375 of the push pin 370. The central ball bearing 390 and the central groove 234 may have substantially the same radius of curvature so that the central ball bearing 390 may be substantially flush with the surface of the central groove 234.

Figure 11:
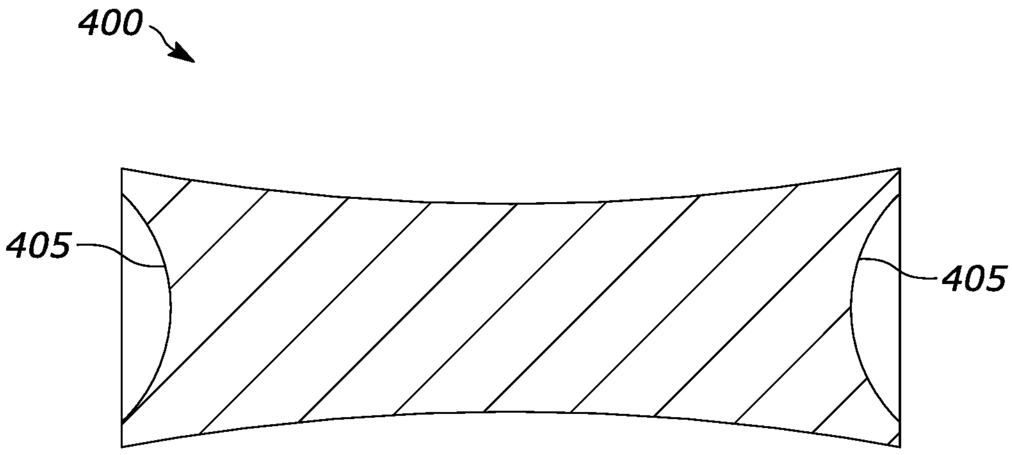
FIG. 11 shows a cross-sectional view of an alternate example of a push pin.

As shown in FIG. 11, an alternate form of the push pin 400 may have a different outer shape than the push pin 370. For example, instead of a rectangular cross section (e.g., forming a cylindrical body) like in the push pin 370 in FIG. 10, the push pin 400 may have an hourglass shaped body as viewed in cross section. In other words, a center of the push pin 400 may be narrower than the ends of the push pin 400. Additionally, the outer surface of the push pin 400 may curve between the ends. When viewed in three dimensions, this shape may form a hyperboloid. In the illustrated example, the widest portion of the push pin 400 may be approximately the same width as the widest portion of the push pin 370.

In other examples, the outer surface of the push pin 400 may not form a smooth curve, and may instead include an angled portion (e.g., where the narrowest point of the push pin 400 may be formed at a point). When viewed in three dimensions, the push pin 400 may not be rounded and may include a number of sides to approximate a curved surface.

The push pin 400 may include cutouts 405 at either end. The cutouts 405 may be substantially the same size as the cutouts 375 and may receive the same sized ball bearings 380. The push pin 400 therefore may be interchanged with the push pin 370.

Figure 12:
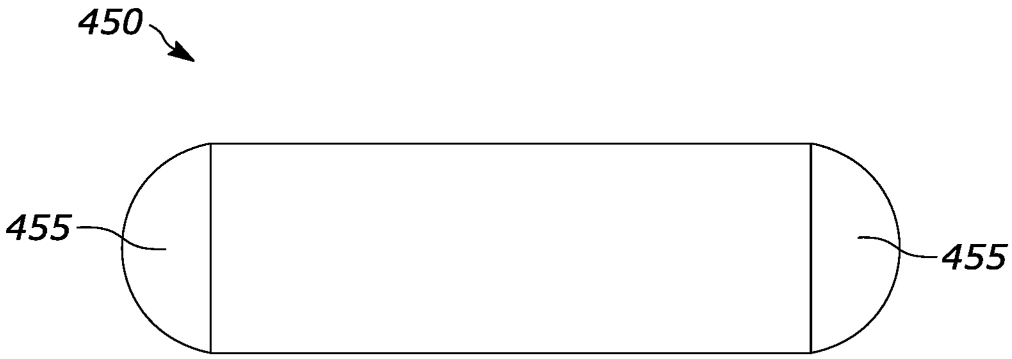
FIG. 12 shows a cross-sectional view of a further alternate example of a push pin.

As shown in FIG. 12, a further alternate form of the push pin 450 may have an outer shape similar to the push pin 370. For example, the push pin 450 may have a substantially cylindrical body and appear rectangular in cross section. Instead of cutouts at either end, the push pin 450 may include rounded (e.g., semi-spherical) ends 455. A tool 100 that uses the push pin 450 may not use the ball bearings 380 (e.g., the ends 455 may be similarly shaped to the ball bearings 380). This may simplify manufacturing and/or assembly as fewer parts are needed. In other examples (not shown), the push pin 450 may include the hourglass shape like the push pin 400, while still including the rounded ends 455.

In still other examples, the body of the push pin may not be symmetrical along its elongated axis. For example, the curved portion between either end of the push pin 400 may be included on a single side while the other may be substantially straight (in cross section).

Returning to FIGS. 4 and 7, an outlet 410 may be disposed within the wall 320. The outlet 410 may therefore be disposed between each of the bores 315. Although not shown, the outlet 410 may be fluidly connected to each of the bores 315.

The outlet 410 may terminate at a chamber 415, thus providing fluid communication between the bores 315 and the chamber 415. A valve 420 may be disposed within the outlet 410 to control fluid flow between the bores 315 and the chamber 415.

Although not shown, the chamber 415 may include a piston, which may be driven by fluid flowing from the bores 315. The piston in the chamber 415 may be capable of extending and retracting to move the working portion 140 of the tool 100.

In use, the user may connect the battery 110 to the body 120 and actuate the tool 100 by engaging at least one of the controls 130. This causes electrical energy to power the motor 200, which in turn rotates the gear assembly 210. The inclined plate 220 is connected to the gear assembly 210 and is driven by the rotation of the gear assembly 210.

Figure 5:
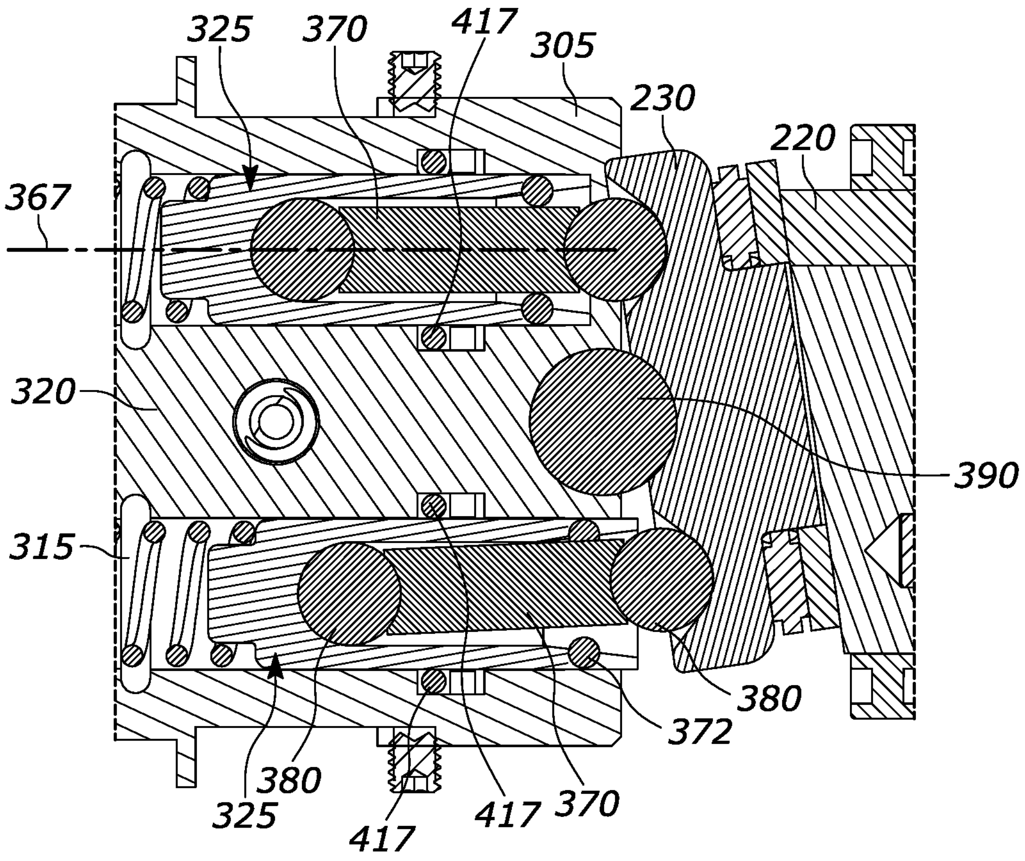
FIG. 5 shows a detailed view of the cross-sectional view of FIG. 4.
Figure 7:
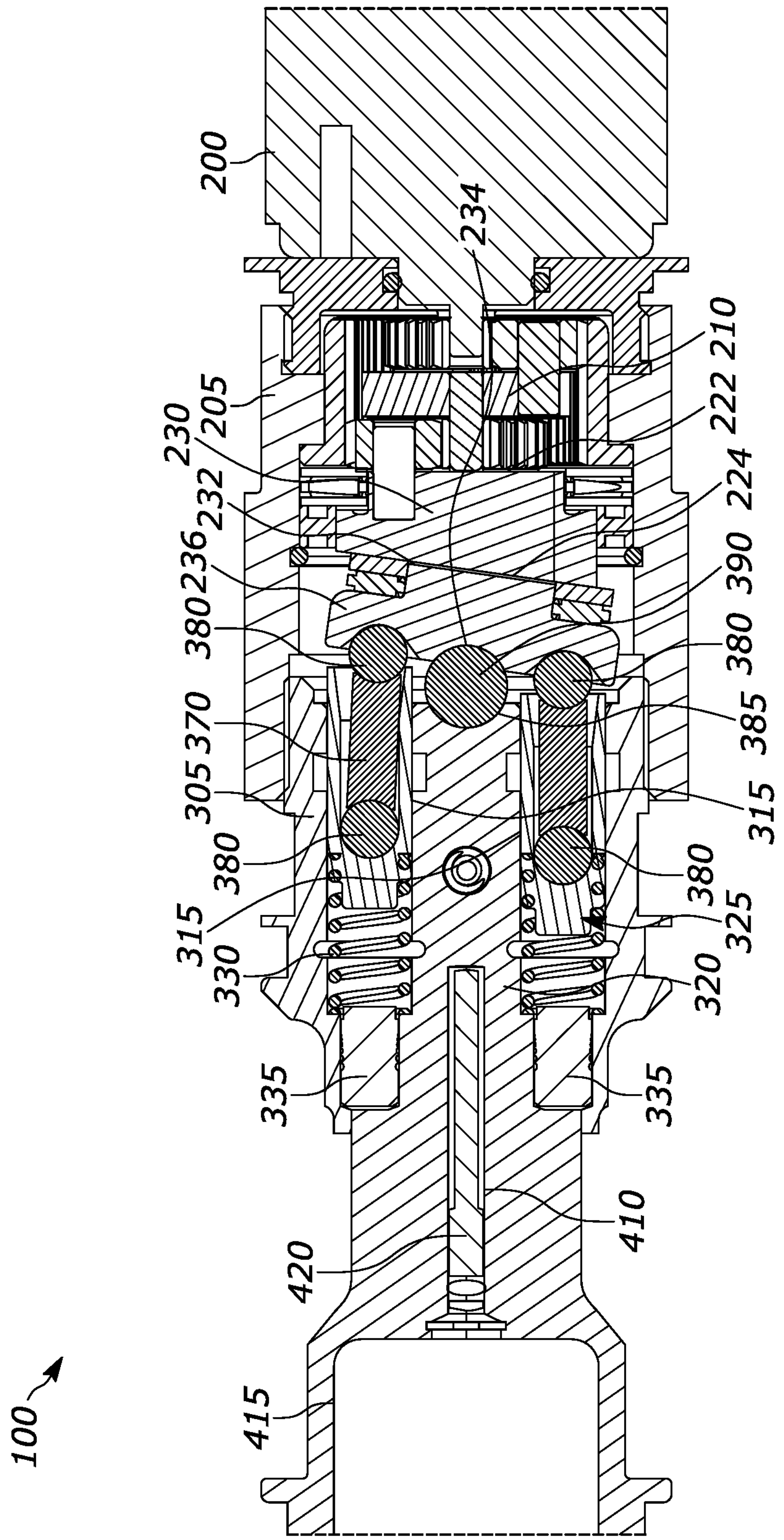
FIG. 7 shows a cross-sectional view of the tool of FIG. 1, illustrating the tool in a second position.

The rotation of the inclined plate 220 causes a change in orientation of the inclined plate 220. In other words, the rotational position of the second planar surface 224 changes as the inclined plate rotates 220. For example, FIGS. 4 to 6 illustrates the inclined plate 220 with the second planar surface 224 oriented so that the greater width relative to the first planar surface 222 is at the top of the figure. In FIGS. 7 and 8, the inclined plate 220 has rotated approximately 180° so that the second planar surface 224 is oriented so that the greater width relative to the first planar surface 222 is at the bottom of the figure. Rotation between these locations may continue as the inclined plate 220 continues to be driven by the motor 200 via the gear assembly 210. For example, the orientation of the second planar surface 224 may oscillate between these positions as the motor 200 drives the gear assembly 210.

The wobble plate 230 contacts the second planar surface 224 as the inclined plate 220 rotates. However, unlike the inclined plate 220, the wobble plate 230 does not rotate with the inclined plate 220. Instead, the rotation of the inclined plate 220 causes the wobble plate 230 to rock or wobble, although some examples may include a wobble plate 230 that moves with some rotation.

Figure 3A:
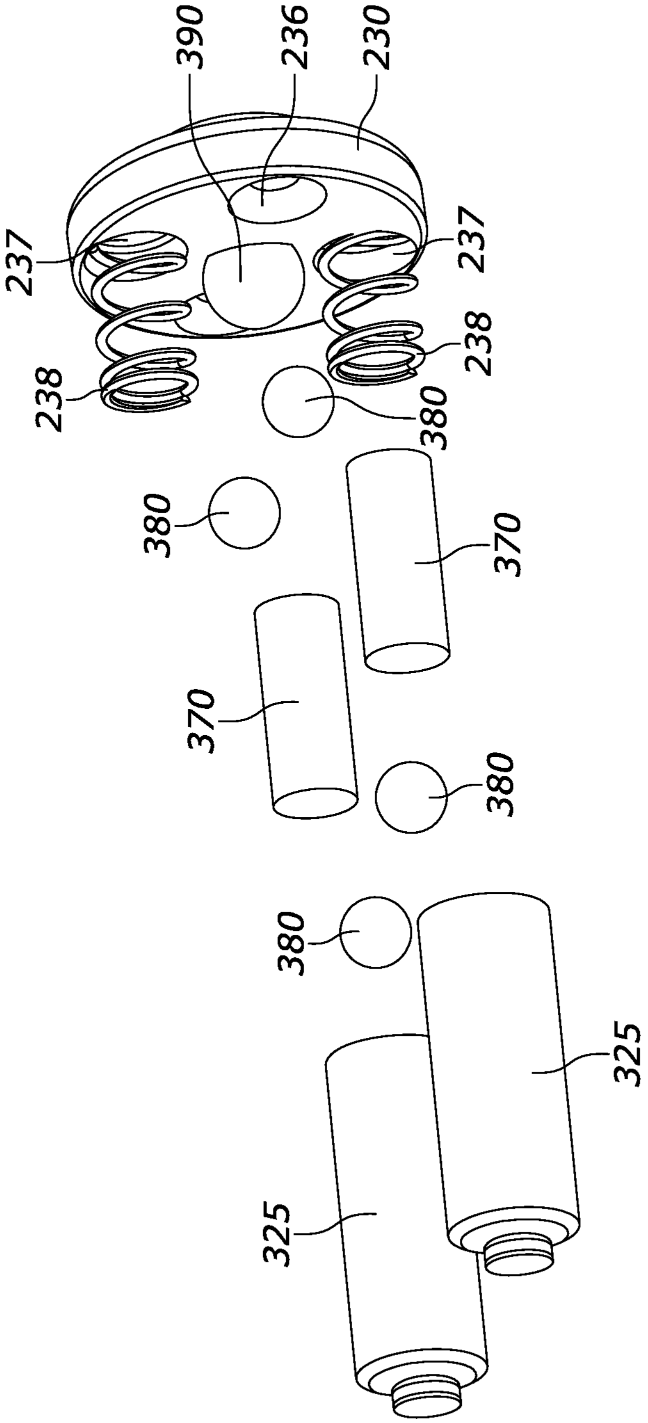
FIG. 3A shows a detailed exploded view of a reciprocating assembly of the tool of FIG. 1.
Figure 13:
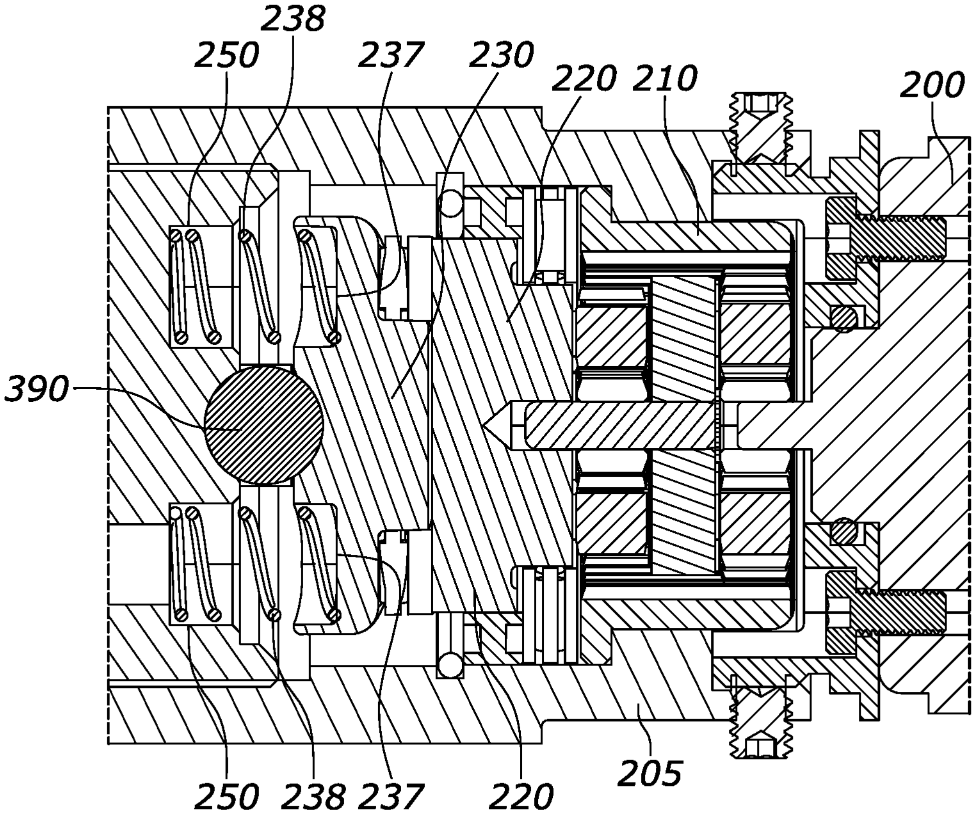
FIG. 13 shows a detailed view of a cross-sectional view of the tool illustrating springs of an anti-rotational assembly.
Figure 14:
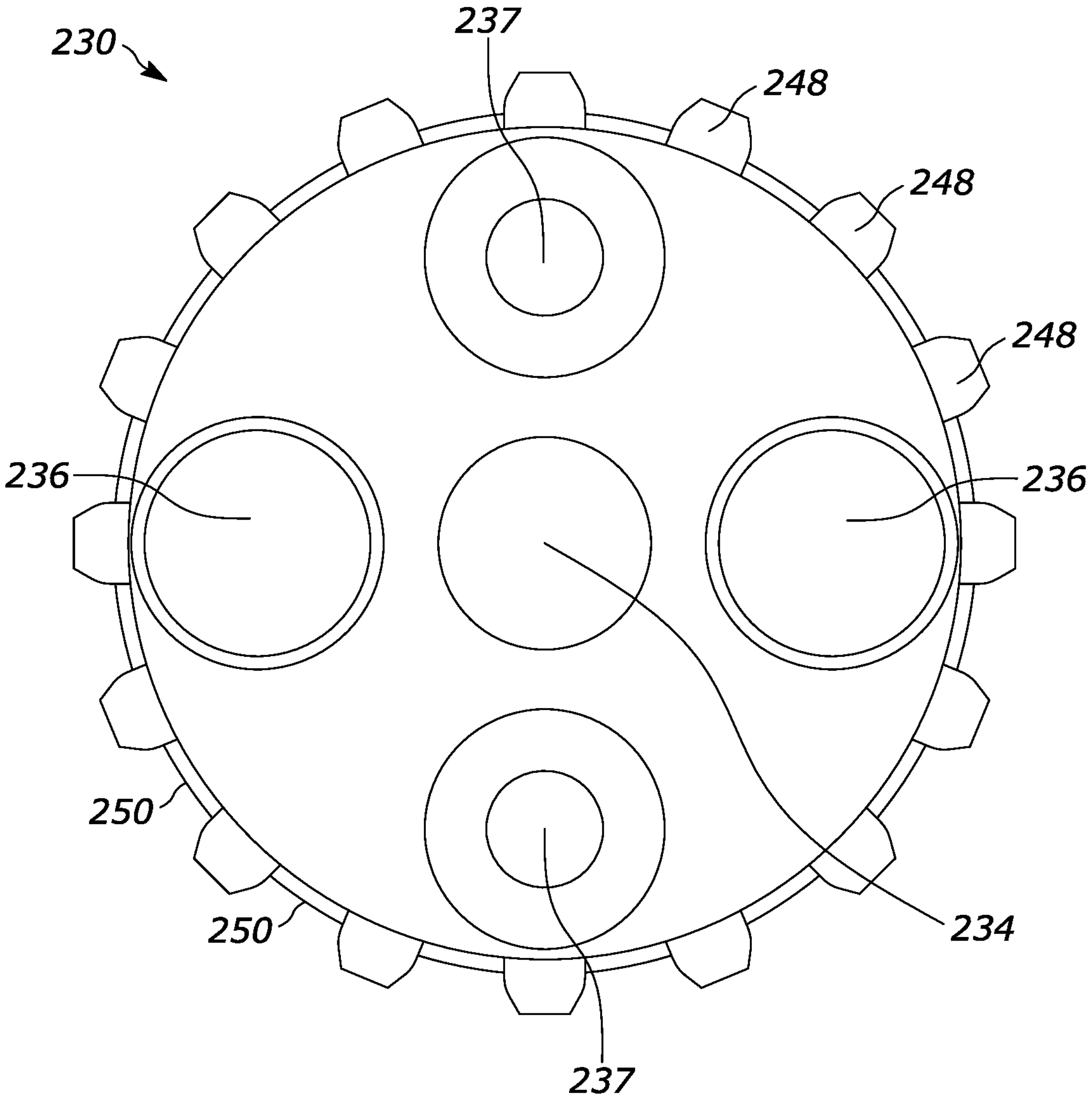
FIG. 14 shows a front view of an alternate wobble plate.
Figure 15:
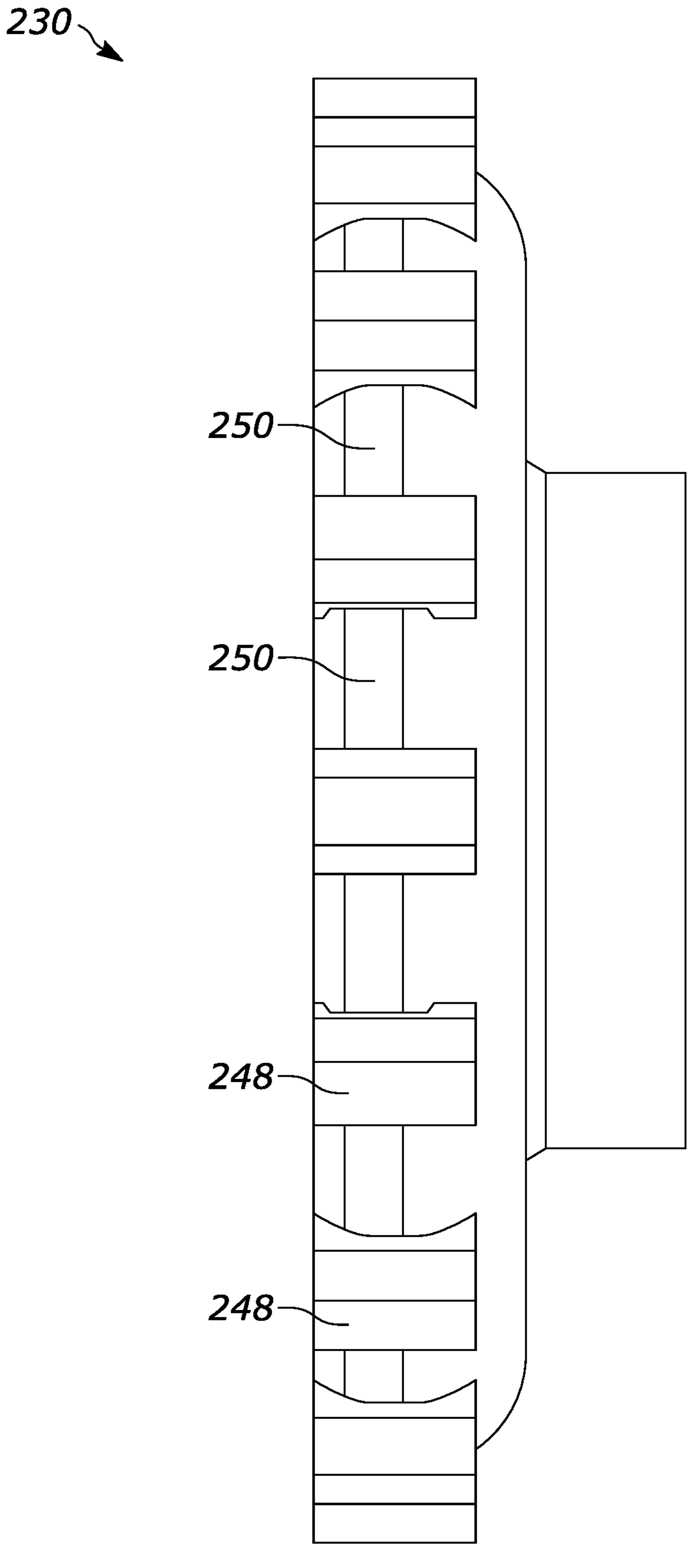
FIG. 15 shows a side view of the alternate view of the wobble plate of FIG. 14.
Figure 16:
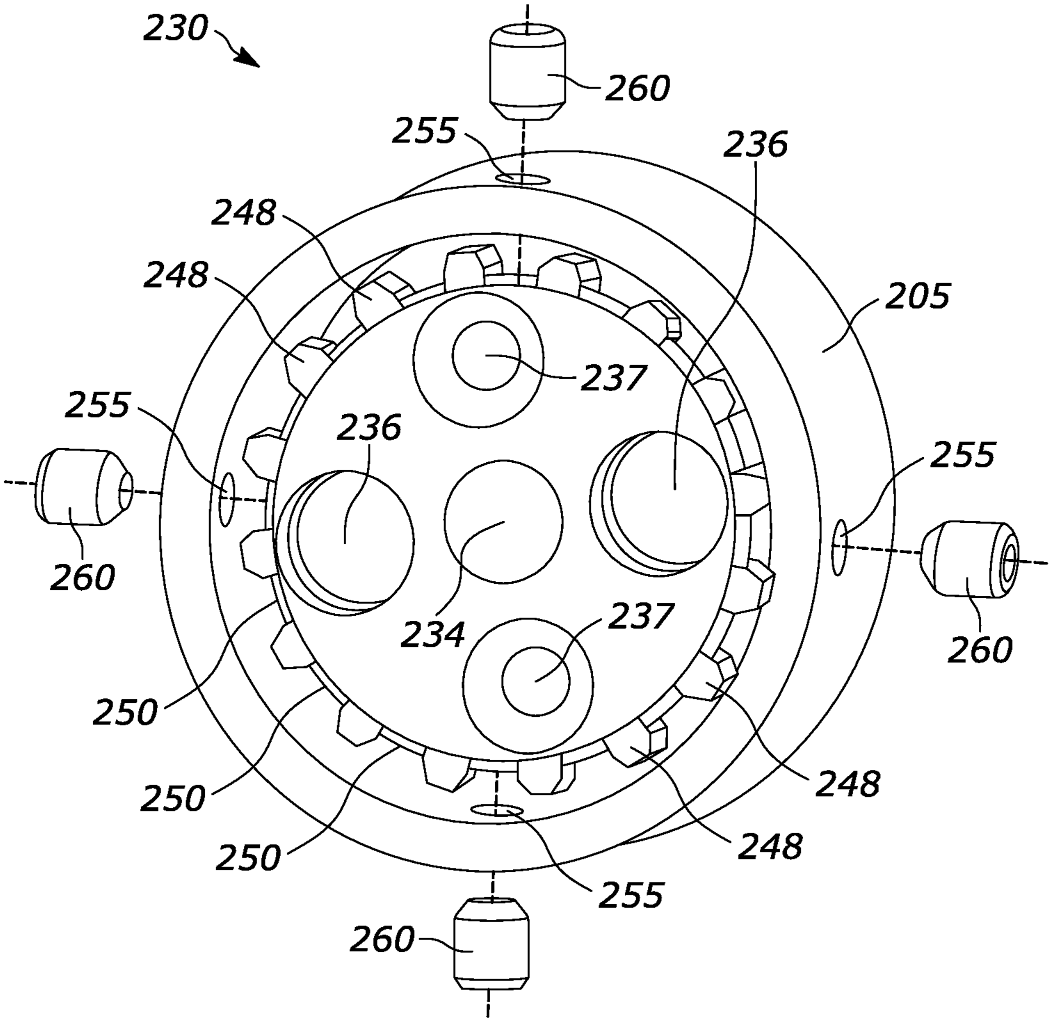
FIG. 16 shows a partially exploded view of an alternate anti-rotational assembly including the wobble plate of FIG. 14.
Figure 17:
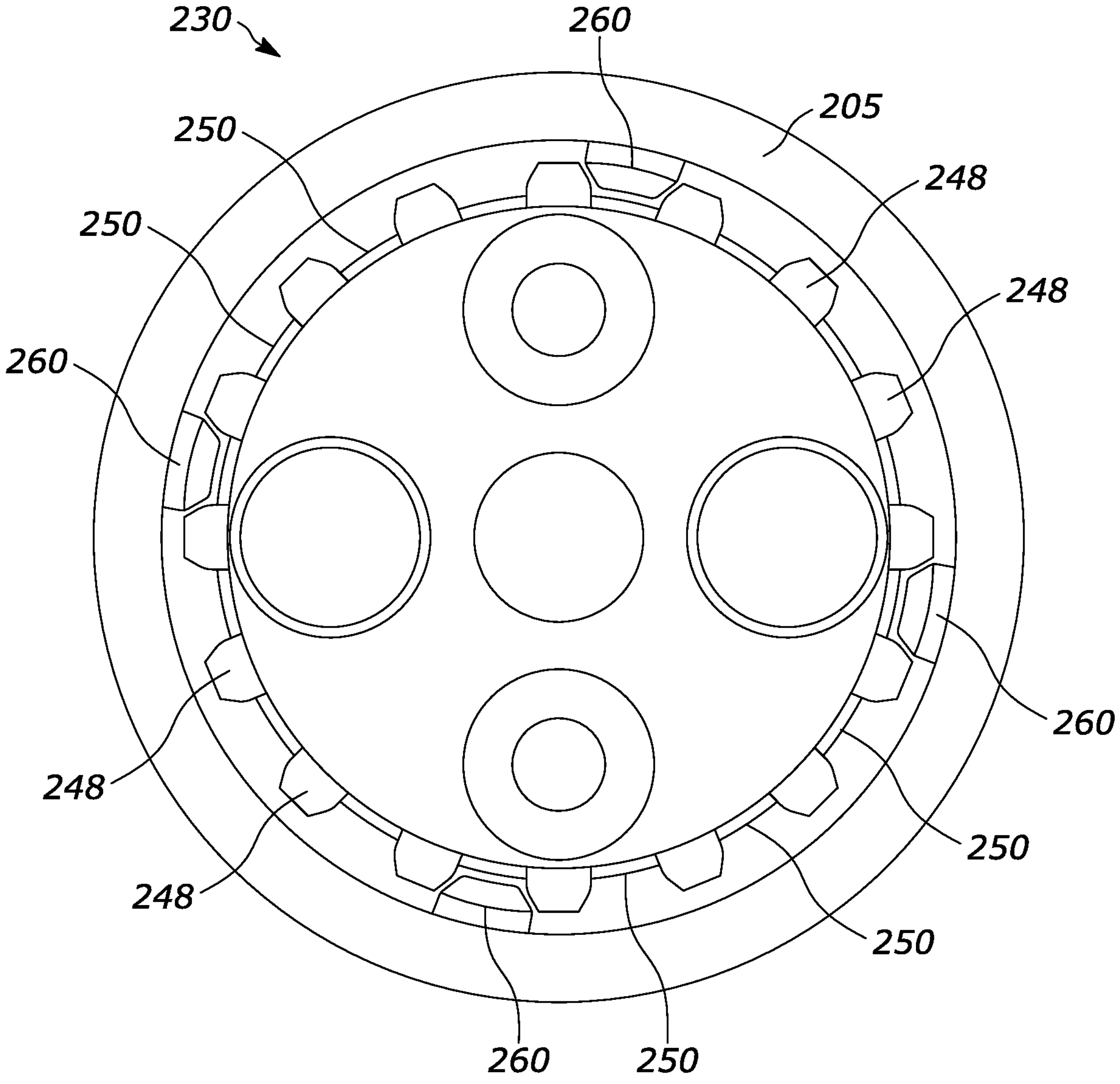
FIG. 17 shows a perspective view of the alternate anti-rotational assembly of FIG. 16.

As shown in FIGS. 3A and 13, one or more springs 238 (e.g., two shown) are used to limit rotation of the wobble plate 230, e.g., form an anti-rotational assembly. The springs 238 may be positioned within the second grooves 237 of the wobble plate 230 and may each extend into a pocket in the housing 305. In use, the axial load from the springs 238 may be greater than the bearing friction from any or all the bearings 380, 390. This may sufficiently restrain rotational movement while permitting axial movement in the form of the reciprocating wobble. As this movement occurs, the compression in the springs 238 may change. In other words, the top spring 238 and the bottom spring 238 (as viewed in FIG. 13) may alternatively have a different compressive load.

As shown in FIGS. 14 to 17, an alternate example may use a pin arrangement in an anti-rotational assembly to limit rotational movement of the wobble plate 230. In the illustrated example, the outer perimeter of the wobble plate 230 may include a series of teeth 248 and grooves 250. The teeth 248 and grooves 250 may have a partially stepped pattern, although other patterns may be used (e.g., inclined, curved, etc.). For example, the illustrated teeth 248 may slightly narrow in a direction distal to the surface of the wobble plate 230. The housing 205 may include one or more holes 255, which may align with one of the grooves 250 when the tool 100 is assembled. A pin 260 may be inserted through a hole 255 and aligned with one of the grooves 250. The pin 260 may have approximately the same width as the width of the groove 250. For example, the pins 260 may have a frustoconical shape that corresponds to the shape of the teeth 248 and may contact the surface of the teeth 248 when fully inserted in the respective hole 255. Thus, the pin 260 may fit between adjacent teeth 248 but there may not be substantially room for the pin 260 to shift between the adjacent teeth 248. In use, the size of the pin 260 between the teeth 248 may limit rotational movement of the wobble plate 230. However, because the teeth 248 are disposed only along the radial direction, the wobble plate 230 may still be movable in the axial direction.

In some forms, the pin 260 may be a separate element and may be inserted through a hole 255 (see e.g., FIG. 2) after the wobble plate 230 is assembled. Any number of pins 260 may be used (e.g., one, two, three, four, etc.). In other forms, the pins 260 may be permanently connected to the housing 205 and may assist in guiding the wobble plate 230 into position during assembly. In still other example, the pin 260 may be connected to the wobble plate 230. The pin 260 may retract (e.g., against the bias of a spring) as the wobble plate 230 is inserted into the housing 205 during assembly. Once aligned with the hole 255, the pin 260 may extend through the hole 255. In this example, the wobble plate 230 may not include the teeth 248 and grooves 250 and may instead include an elongated hole 255 in the axial direction.

In some forms, the pin 260 and the springs 238 may operate with the same wobble plate 230.

As described above, the rotation of the inclined plate 220 changes the position of the second planar surface 224. Because the third planar surface 232 of the wobble plate 230 is flush or substantially flush with the second planar surface 224, the inclination of the wobble plate 230 changes because of the rotation of the inclined plate 220.

For example, the wobble plate 230 is closer to the upper bore 315 as shown in FIGS. 4 to 6 and is closer to the lower bore 315 as shown in FIGS. 7 and 8. The wobble plate 230 may rock between these two positions as the inclined plate 220 continues to rotate.

As the wobble plate 230 rocks between the positions illustrated in FIGS. 4 and 7, the wobble plate 230 pivots the push pins 370 within the respective cavity 355. For example, a ball bearing 380 is sandwiched between the terminal end 360 of each cavity 355 and the cutout 375 of each push pin 370. The spherical ball bearing 380 allows for pivoting movement of the respective push pin 370 because the rounded cutout 375 can move along the surface of the respective ball bearing 380. Similarly, on the other end, the additional ball bearing 380 is received between the opposite cutout 375 and the respective first side groove 236. The larger radius of curvature of the first side groove 236 as compared to the ball bearing 380 allows the wobble plate 230 to move between the positioned of FIGS. 4 and 7.

Additionally, the central ball bearing 390 is received between the wall 320 and the central groove 234. The central ball bearing 390 creates contact between the wall 320 and the wobble plate 230. The central ball bearing 390 may also provide a pivot point for the wobble plate 230 to rock against as the inclined plate 220 rotates.

The pivoted position of each push pin 370 may correspond with a position of the piston 325. Starting with FIGS. 4 to 6, the tool 100 is illustrated so that the inclined plate 220 is oriented with the wider portion (distance between the first and second planar surfaces 222, 224) on top. The wobble plate 230 is similarly oriented so that the top first side groove 236 is closer to the respective piston 325 than the bottom first side groove 236 is to the respective piston 325. In this position, the top push pin 370 is oriented substantially along the axis 367 of the respective piston 325 (e.g., between the terminal end 360 and the open end 365). The bottom push pin 370 may be angled relative to the axis 367 of the bottom piston 325. For example, the bottom push pin 370 may pivot toward the top push pin 370 in this position.

In FIGS. 7 and 8, the tool 100 is illustrated so that the inclined plate 220 is oriented with the wider portion on the bottom. The wobble plate 230 is similarly oriented so that the bottom first side groove 236 is closer to the respective piston 325 than the top first side groove 236 is to the respective piston 325. In this position, the bottom push pin 370 is oriented substantially along the axis 367 of the respective piston 325 (e.g., between the terminal end 360 and the open end 365). The top push pin 370 may be angled relative to the axis 367 of the top piston 325. For example, the top push pin 370 may pivot toward the bottom push pin 370 in this position.

In the illustrated examples, the width of each push pin 370 may be less than the width of the respective cavity 355. More particularly, the width of each cavity 355 may be wide enough to provide clearance for the above-described pivoting movement of a push pin 370. For example, the bottom push pin 370 in FIGS. 4 to 6 and the top push pin 370 in FIGS. 7 and 8 may avoid contact with the wall of the cavity 355 in the pivoted position. This may assist in limiting frictional wear between the push pins 370 and the cavity 355 to better maintain the structural integrity of the push pins 370.

As shown in FIGS. 5 and 6, some forms of the tool 100 may include one or more O-rings. In one form as shown in FIG. 5, each piston 325 includes a first O-ring 372 proximate to the respective open end 365. Each push pin 370 may move relative to the respective first O-ring 372 and may contact the respective first O-ring 372 proximate to its end of travel. In another form as shown in FIG. 6, a second O-ring 374 may be coupled to an outer surface of one or more of the push pins 370. The second O-ring 374 moves with the respective push pin 370 so that there is no relative movement. This second O-ring 374 may be positioned proximate to a middle of the respective push pin 370 and may contact the wall of the cavity 355 between the terminal end 360 and the open end 365. As shown in FIG. 6, both the first and second O-rings 372, 374 may be included in the same tool 100, although other examples may include only the second O-ring 374 connected to the push pin 370.

The O-ring 374 may assist with aligning the push pin 370 within the respective cavity 355 along the axis 367. For example, the outer width of the O-ring may be substantially equal to the width of the cavity 355. This may minimize or eliminate any clearance and help to ensure that the push pin 370 is oriented along the axis 367.

In certain forms, the O-rings 372, 374 may be compressible. For example, the push pin 370 may compress the O-rings 372, 374 against the wall of the cavity 355 as the push pin 370 pivots. The O-rings 372, 374 therefore may not limit motion of the push pin 370.

The frustoconical shape of the open end 365 of each cavity 355 may provide additional clearance for the respective push pin 370 to assist in better avoiding contact. The frustoconical shape with the widest portion proximate to the second end 345 provides additional space for the push pin 370 to move and increases its range of travel.

In forms that include the O-ring 372 proximate to the open end 365, the O-ring 372 may provide additional assistance in minimizing contact between the push pin 370 and the wall of the cavity 355. For example, the push pins 370 may contact the compressible O-ring 372 and limit the increased frictional engagement with the wall of the cavity 355.

The hourglass or hyperboloid shape of the push pin 400 in FIG. 11 may provide additional clearance between the push pin 400 and the wall of the cavity 355. For example, the hourglass shaped push pin 400 includes portions with a reduced width (as compared to the push pin 370). This reduced width may provide additional spacing between the cavity 355 to account for tolerances in the width of the cavity 355. For example, the push pin 400 may not contact the O-rings 372 in FIG. 5 at the end of travel.

Returning to FIGS. 4 to 8, the pivoting movement of the push pins 370 corresponds to movement of the pistons 325. The pistons 325 are designed to move linearly within the respective bore 315. Movement of the push pins 370 because of the changing position of the wobble plate 230 affects the translational position of the pistons 325.

As illustrated in FIGS. 4 to 6, the top piston 325 is closer to the respective valve 335 than the bottom piston 325 is to the respective valve 335. In other words, the top spring 330 is more compressed than the bottom spring 330, and there is less space between the first end 340 and the valve 335 in the top bore 315 than in the bottom bore 315.

As described above, the top first side groove 236 is proximate to the top bore 315 and the top push pin 370 is substantially straight. In this position, the push pin 370 may be providing a pushing force to the piston 325 that overcomes the bias of the spring 330. In other words, as the inclined plate 220 turns and the wobble plate 230 rocks to its position in FIGS. 4 to 6, the rigid body of the top push pin 370 may be pushed toward the terminal end 360 of the piston 325, thus driving the piston 325 toward the valve 335.

Simultaneously, the lower first side groove 236 is distal to the bottom bore 315 and the bottom push pin 370 is inclined relative to the axis 367 along the cavity 355 of the bottom piston 325. The movement of the lower first side groove 236 away from the bore 315 provides a limited pushing force via the push pin 370 that is not sufficient to overcome the bias of the spring 330.

As the inclined plate 220 rotates to the position in FIGS. 7 and 8, the lower first side groove 236 moves toward the bottom bore 315 and the bottom push pin 370 is substantially straight. As the wobble plate 230 rocks toward this position, the push pin 370 is pushed toward the terminal end 360 of the piston 325. This pushing force overcomes the bias of the spring 330 and drives the piston 325 toward the valve 335.

Simultaneously, the upper first side groove 236 moves away from the top bore 315 and the top push pin 370 becomes inclined relative to the axis 367 along the cavity 355 of the top piston 325. The movement of the top first side groove 236 away from the bore 315 reduces the pushing force applied toward the terminal end 360 in FIGS. 4 to 6 and allows the bias of the spring 330 to overcome any force from the top push pin 370. This allows the top piston 325 to move toward a retracted position in FIGS. 7 and 8.

This movement of the pistons 325 drives the movement of the hydraulic fluid during operation of the tool 100. More specifically, displacement of each piston 325 causes displacement of the hydraulic fluid either into or out of the bore 315. For example, in the retracted position (e.g., the bottom piston 325 in FIGS. 4 to 6 and the top piston 325 in FIGS. 7 and 8), space within the bore 315 increases. The respective valve 335 may allow hydraulic fluid to flow into the bore 315 from the reservoir via the inlet 310 (e.g., so that the bore 315 contains the hydraulic fluid). As the piston 325 moves toward the extended position (e.g., the top piston 325 in FIGS. 4 to 6 and the bottom piston 325 in FIGS. 7 and 8), the fluid within the bore 315 is driven out. In the extended position, the valve 335 is closed to limit backflow into the reservoir. Instead, a valve (e.g., valve 420) may be opened to allow the fluid to leave the bore 315 and travel toward the chamber 415. An O-ring 417 may be disposed around an outer perimeter of each piston 325 in order to limit flow out of the bore 315 and toward the motor 200.

The continuing rotation of the inclined plate 220 (e.g., if the user continues to actuate the control 130) continues to drive the movement of the pistons 325 in a reciprocating motion so that the hydraulic fluid continues to be driven from the reservoir and into the chamber 415. Once in the chamber 415, another piston (not show) may continue to drive the fluid toward the working portion 140 to actuate the jaws 145.

The efficiency on the fluid moving process (e.g., drawing fluid into the bore 315 and pushing the fluid toward the chamber 415) may be a product of the linear force provided by the piston 325. More specifically, the pistons 325 are intended to move in the left-right direction as shown in FIGS. 4 to 8. Particularly in the extended position of the respective piston 325, movement directly along this axis 367 will provide the most force for pushing against the spring 330.

To limit losses (e.g., via friction) because of the inclination of the wobble plate 230, the pivoting movement of the push pins 370 may help to direct more of the force along the axis 367 of the respective piston 325.

As described above, each push pin 370 can pivot because of contact with the ball bearings 380 and the clearance within the cavity 355. This movement is specifically driven by the movement of the wobble plate 230. Because of the inclination of the wobble plate 230 relative to the bore 315, the wobble plate 230 may provide a force that is oriented in two directions (e.g., a component may be oriented in the vertical and the horizontal direction as viewed in FIGS. 4 to 8). While the horizontal component is desired to move the piston 325 against the spring, the vertical component may move the piston 325 into the wall of the bore 315. This may cause frictional engagement while moving the piston 325, so that a greater resultant force is required to overcome the spring bias and the outer surface of the piston 325 may wear.

The push pins 370 can help address this problem by tending to reduce the vertical component of the force and increase the horizontal component so that a greater percentage of the resultant force is directed along the axis 367 of the cavity 355. The force is transferred along the substantially rigid push pin 370 and is applied to the respective piston 325 proximate to the first end 340 (e.g., proximate to the terminal end 360) as opposite to proximate to the second end 345. Moving the force application point toward the first end 340 may enable the vertical force component to be lessened.

The ball bearing 380 between the first side groove 236 and the push pin 370 may be maintained substantially in the center of the respective first side groove 236. In the extended position, the center of the first side groove 236 is closest to the second end 345, and more particularly is closest to the axis 367 of the cavity 355. Because the push pin 370 is substantially rigid (e.g., does not substantially stretch or compress) the shortest distance between the terminal end 360 and the center of the first side groove 236 is a substantially straight line along the axis 367. The push pin 370 therefore reduces the angle that the force is applied along as compared to the axis 367 (e.g., as compared to the force being applied directly at the second end 345). A smaller angle means that the more of the force is directed along the horizontal axis 367 into the bias of the spring and less is directed toward the wall of the bore 315 (e.g., limiting frictional engagement).

The pivoting movement of each push pin 370 enables the wobble plate 230 and inclined plate 220 to continue to move so that the system can maintain reciprocating motion. The push pins 370 are oriented so that in the driving position, the push pin 370 can transfer force closer to the first end 340 and achieve more efficiency, while in the non-driving position, the push pin 370 does not interfere with the motion of the system.

Although the above description was specifically focused on a hydraulic tool, this disclosure could be used in similar reciprocating devices. For example, other types of systems that are driving by the movement of a piston within a cylinder may experience similar problems of inefficiency and frictional wear. A push pin inserted into a piston that includes an internal cavity can be readily used by a person of ordinary skill in the art in order to achieve a greater percentage of the resultant force directed along the direction of travel of the piston.

One of ordinary skill will appreciate that the exact dimensions and materials are not critical to the disclosure and all suitable variations should be deemed to be within the scope of the disclosure if deemed suitable for carrying out the objects of the disclosure.

One of ordinary skill in the art will also readily appreciate that it is well within the ability of the ordinarily skilled artisan to modify one or more of the constituent parts for carrying out the various examples of the disclosure. Once armed with the present specification, routine experimentation is all that is needed to determine adjustments and modifications that will carry out the present disclosure.

The above examples are for illustrative purposes and are not intended to limit the scope of the disclosure or the adaptation of the features described herein. Those skilled in the art will also appreciate that various adaptations and modifications of the above-described preferred examples can be configured without departing from the scope and spirit of the disclosure. Therefore, it is to be understood that, within the scope of the appended claims, the invention may be practiced other than as specifically described.

What is claimed is:

1. A reciprocating assembly for driving a working portion of a tool, the reciprocating assembly comprising:
- a bore configured to contain hydraulic fluid;
- a piston received within the bore and configured to move within the bore in a reciprocating motion between an extended position and a retracted position, wherein displacement of the piston within the bore is configured to cause displacement of hydraulic fluid when hydraulic fluid is in the bore, the piston including an internal cavity extending at least partially along a length of the piston; and
- a push pin received within the internal cavity of the piston;
- wherein the bore, the piston, and the push pin are configured such that a movement of the push pin relative to the bore causes translation of the piston within the bore to the extended position along a translation axis; and
- wherein the push pin is configured to pivot during the movement of the push pin, between an in-line position and an angled position, the in-line position substantially parallel to the translation axis; and
- wherein the push pin includes a cutout at each of two opposite ends, and wherein each cutout is configured to at least partially receive a ball bearing, and wherein one of the ball bearings is received within the internal cavity and the other of the ball bearings is coupled to a drive assembly configured to supply a force which causes the movement of the push pin, and wherein the push pin is configured to rotate about the ball bearings.

2. The reciprocating assembly of claim 1, wherein the cavity extends along a majority of the length of the piston.

3. The reciprocating assembly of claim 1, wherein the internal cavity includes a terminal end and an open end, the open end being wider than the terminal end.

4. The reciprocating assembly of claim 1, further comprising a drive assembly configured to supply a force which causes the movement of the push pin, wherein the drive assembly comprises:
- an electric motor;
- a gear assembly configured to be driven by the electric motor;
- an inclined plate rotatably connected to the gear assembly and configured to be driven by the gear assembly; and
- a wobble plate connected to the inclined plate and configured to be driven by rotation of the inclined plate;
- wherein the wobble plate is configured to not rotate with the inclined plate.

5. The reciprocating assembly of claim 4, further comprising an anti-rotational assembly connected between the wobble plate and a housing containing the bore, the anti-rotational assembly configured to limit rotation of the wobble plate and permit axial movement of the wobble plate.

6. A reciprocating assembly for driving a working portion of a tool, the reciprocating assembly comprising:
- a bore configured to contain hydraulic fluid;
- a piston received within the bore and configured to move within the bore in a reciprocating motion between an extended position and a retracted position, wherein displacement of the piston within the bore is configured to cause displacement of hydraulic fluid when hydraulic fluid is in the bore, the piston including an internal cavity extending at least partially along a length of the piston; and
- a push pin having a first end received within the internal cavity of the piston, the first end having a first radius of curvature;
- wherein the push pin is configured to pivot about a center of the first radius of curvature between an in-line position and an angled position, the in-line position substantially parallel to a translation axis of the piston; and
- wherein the piston is configured to move from the retracted position toward the extended position when the push pin is in the in-line position;
- wherein the first end includes a first cutout having the first radius of curvature;
- wherein the first cutout at least partially receiving a first ball bearing; and
- wherein the push pin is configured to rotate about the first ball bearing.

7. The reciprocating assembly of claim 6, wherein:

a second end of the push pin opposite the first end includes a second cutout having a second radius of curvature;

the second cutout at least partially receiving a second ball bearing; and the second ball bearing is coupled to a drive assembly configured to supply a force which causes the movement of the push pin.

8. The reciprocating assembly of claim 4, further comprising a drive assembly configured to supply a force which causes the movement of the push pin, wherein the drive assembly comprises:

an electric motor;

a gear assembly configured to be driven by the electric motor;

an inclined plate rotatably connected to the gear assembly and configured to be driven by the gear assembly; and a wobble plate connected to the inclined plate and configured to be driven by rotation of the inclined plate;

wherein the wobble plate is configured to not rotate with the inclined plate.

9. The reciprocating assembly of claim 6, wherein an are angle of the first end is less than 180 degrees.

10. A reciprocating assembly for driving a working portion of a tool, the reciprocating assembly comprising:

a bore configured to contain hydraulic fluid;

a piston received within the bore and configured to move within the bore in a reciprocating motion between an extended position and a retracted position, wherein displacement of the piston within the bore is configured to cause displacement of hydraulic fluid when hydraulic fluid is in the bore; and a push pin contacting the piston;

a drive assembly configured to supply a force which causes the movement of the push pin, the drive assembly including a non-rotational plate configured to supply the force by rocking between a first plate position and a second plate position, the plate being closer to the piston in the first plate position than in the second position;

wherein the bore, the piston, and the push pin are configured such that a movement of the push pin relative to the bore causes translation of the piston within the bore to the extended position along a translation axis;

wherein the push pin is configured to pivot during the movement of the push pin, between an in-line position and an angled position, the in-line position substantially parallel to the translation axis, the push pin being in the in-lined position when the plate is in the first plate position and the push pin being in the angled position in the second plate position; and wherein the push pin further includes a first end having a first concave surface and a second end having a second concave surface, wherein a first ball bearing is received within the first concave surface and contacts the piston, wherein a second ball bearing is received within the second concave surface and contacts the plate, and wherein the push pin is configured to rotate about the first ball bearing.

11. The reciprocating assembly of claim 10, wherein:

the plate includes a third concave surface; and the second ball bearing is at least partially received within the third concave surface;

wherein the second ball bearing configured to permit relative movement between the push pin and the plate.

12. The reciprocating assembly of claim 10, wherein the bore is a first bore, the push pin is a first push pin and a piston is a first piston, the reciprocating assembly further comprising:

a second bore spaced apart from the first bore and configured to contain hydraulic fluid;

a second piston received within the second bore and configured to move within the second bore in a reciprocating motion between an extended position and a retracted position, wherein displacement of the second piston within the second bore is configured to cause displacement of hydraulic fluid when hydraulic fluid is in the second bore; and a second push pin contacting the second piston;

the drive assembly configured to supply a force which causes the movement of the second push pin.

13. The reciprocating assembly of claim 12, wherein the plate is closer to the first piston in the first plate position and closer to the second piston in the second position.

14. The reciprocating assembly of claim 12, wherein the translational axis is a first translational axis, wherein:

the second piston moves along a second translational axis that is parallel to the first translational axis; and the second push pin is configured to pivot during the movement of the second push pin, between a second in-line position and a second angled position, the second in-line position substantially parallel to the second translation axis, the second push pin being in the second in-lined position when the plate is in the second plate position and the second push pin being in the angled position in the first plate position.

15. The reciprocating assembly of claim 1, further comprising an O-ring connected to an outer surface of the push pin, wherein the O-ring is compressible.

16. The reciprocating assembly of claim 6, further comprising an O-ring connected to an outer surface of the push pin, wherein the O-ring is compressible.

17. The reciprocating assembly of claim 6, wherein the push pin includes a hyperboloid shape.

18. The reciprocating assembly of claim 10, further comprising an O-ring connected to an outer surface of the push pin, wherein the O-ring is compressible.

19. The reciprocating assembly of claim 10, wherein the push pin includes a hyperboloid shape.

20. The reciprocating assembly of claim 10, wherein the drive assembly further includes:

an electric motor;

a gear assembly configured to be driven by the electric motor;

an inclined plate rotatably connected to the gear assembly and configured to be driven by the gear assembly; and the non-rotational plate connected to the inclined plate and configured to be driven by rotation of the inclined plate;

wherein the non-rotational plate is configured to not rotate with the inclined plate.

* * * * *